US011240191B2

(12) United States Patent
Yasui

(10) Patent No.: US 11,240,191 B2
(45) Date of Patent: Feb. 1, 2022

(54) SOCIALIZING SUPPORT APPARATUS AND NON-TRANSITORY COMPUTER READABLE MEDIUM

(71) Applicant: FUJIFILM Business Innovation Corp., Tokyo (JP)

(72) Inventor: Masahiro Yasui, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 241 days.

(21) Appl. No.: 16/537,629

(22) Filed: Aug. 12, 2019

(65) Prior Publication Data
US 2020/0304452 A1 Sep. 24, 2020

(30) Foreign Application Priority Data
Mar. 22, 2019 (JP) .............................. JP2019-055102

(51) Int. Cl.
*H04L 29/08* (2006.01)
*H04L 12/58* (2006.01)
*G06F 3/12* (2006.01)
*G06Q 50/00* (2012.01)

(52) U.S. Cl.
CPC ............ *H04L 51/32* (2013.01); *G06F 3/1207* (2013.01); *G06F 3/1231* (2013.01); *G06F 3/1259* (2013.01); *G06Q 50/01* (2013.01); *H04L 51/16* (2013.01); *H04L 67/24* (2013.01)

(58) Field of Classification Search
None
See application file for complete search history.

(56) References Cited

U.S. PATENT DOCUMENTS

| | | | |
|---|---|---|---|
| 2013/0185368 A1* | 7/2013 | Nordstrom | H04W 4/21 709/206 |
| 2015/0109112 A1* | 4/2015 | Fadell | G08B 19/005 340/328 |
| 2015/0116107 A1* | 4/2015 | Fadell | G08B 27/003 340/501 |
| 2016/0323707 A1* | 11/2016 | Dupuy | H04L 51/043 |
| 2017/0288893 A1* | 10/2017 | Bunker | H04L 12/282 |
| 2017/0337790 A1* | 11/2017 | Gordon-Carroll | G06F 16/9537 |
| 2018/0108347 A1 | 4/2018 | Ogata et al. | |
| 2019/0238355 A1* | 8/2019 | Marcinkowski | G06K 9/00771 |
| 2019/0371145 A1* | 12/2019 | McQueen | H04L 63/162 |
| 2021/0204115 A1* | 7/2021 | Corsica, IV | H04W 4/70 |

FOREIGN PATENT DOCUMENTS

WO 2016199464 12/2016

\* cited by examiner

*Primary Examiner* — Natisha D Cox
(74) *Attorney, Agent, or Firm* — JCIPRNET

(57) ABSTRACT

A socializing support apparatus includes a detector that detects presence of a visiting user, the visiting user being a user visiting a shared apparatus, and a first controller that controls notification of first notification information, the notification being provided from a terminal apparatus to a terminal user if a notification condition is satisfied, the notification condition being detection of presence of the visiting user, the first notification information being information indicative of presence of the visiting user, the terminal user being a user of the terminal apparatus different from the visiting user.

14 Claims, 17 Drawing Sheets

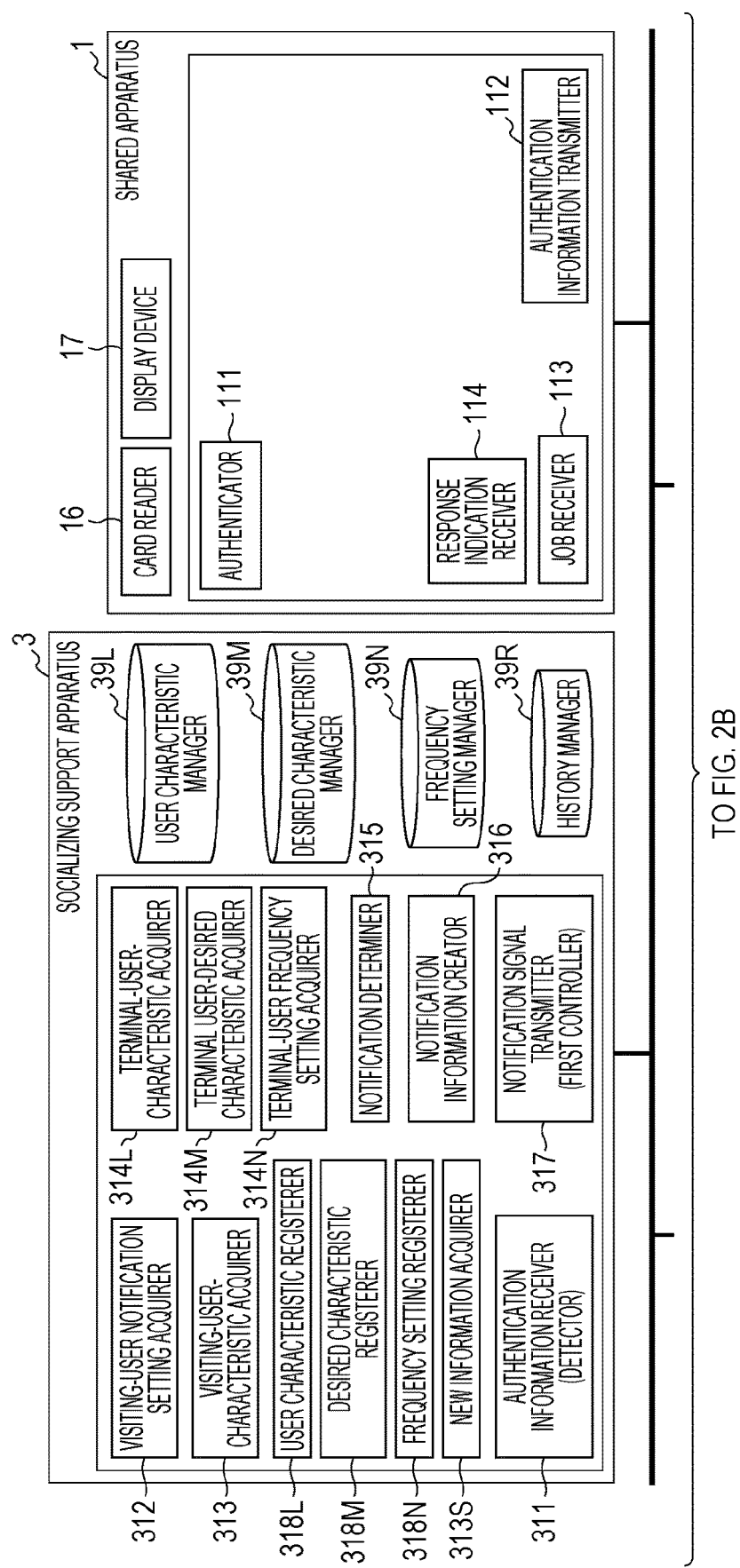

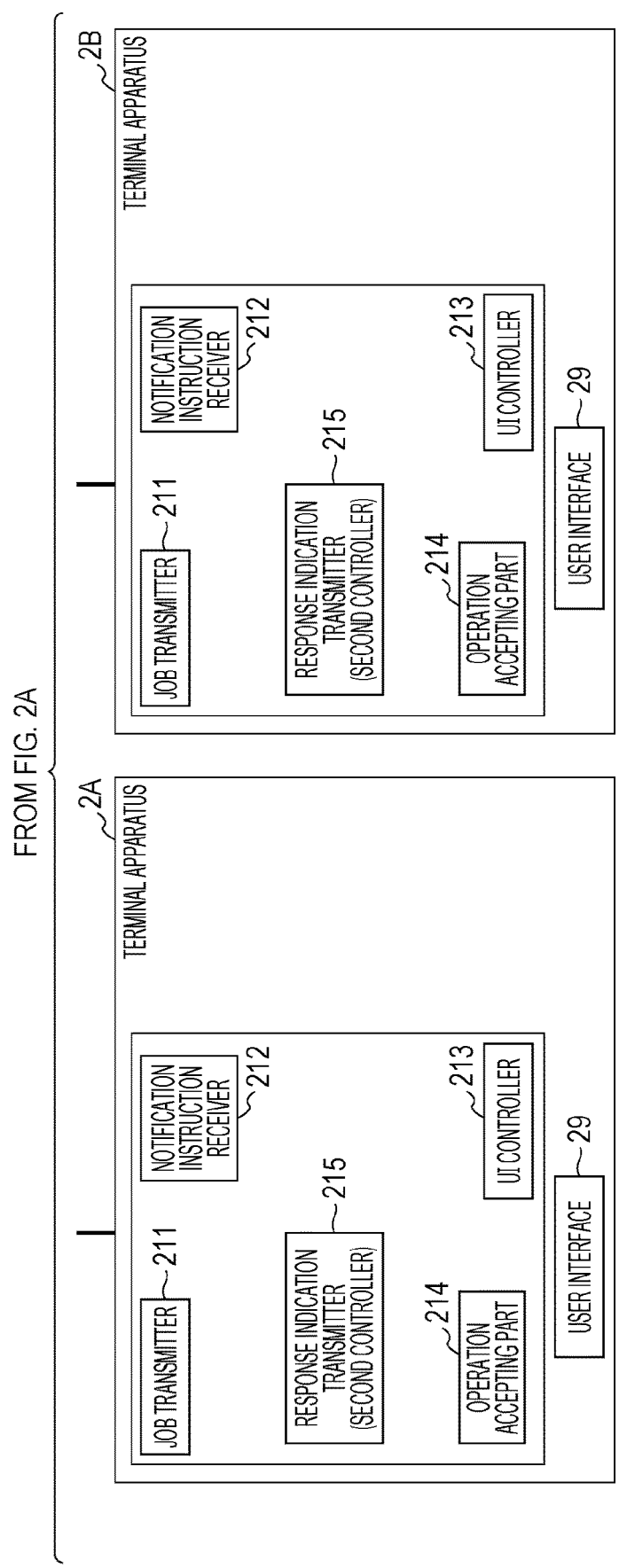

FIG. 8

USER A

|   | DESIRED CHARACTERISTICS | NOTIFICATION FREQUENCY | ▽ |
|---|---|---|---|
| ☐ | CHARACTERISTIC A | EVERY TIME | ▽ |
| ☐ | CHARACTERISTIC B | ONLY FOR FIRST TIME | ▽ |
| ☐ | CHARACTERISTIC C | ONCE EVERY WEEK | ▽ |
| ☐ | CHARACTERISTIC D | ONLY WHEN TICKED | ▽ |

FIG. 9

PERSON WITH FOLLOWING CHARACTERISTICS
HAS AUTHENTICATED (IS AUTHENTICATING).
· FAMILIAR WITH LAW
· FAMILIAR WITH C-LANGUAGE

SEND MESSAGE TO THIS PERSON?

| I'LL BE THERE RIGHT NOW | I WANT TO MEET YOU LATER |

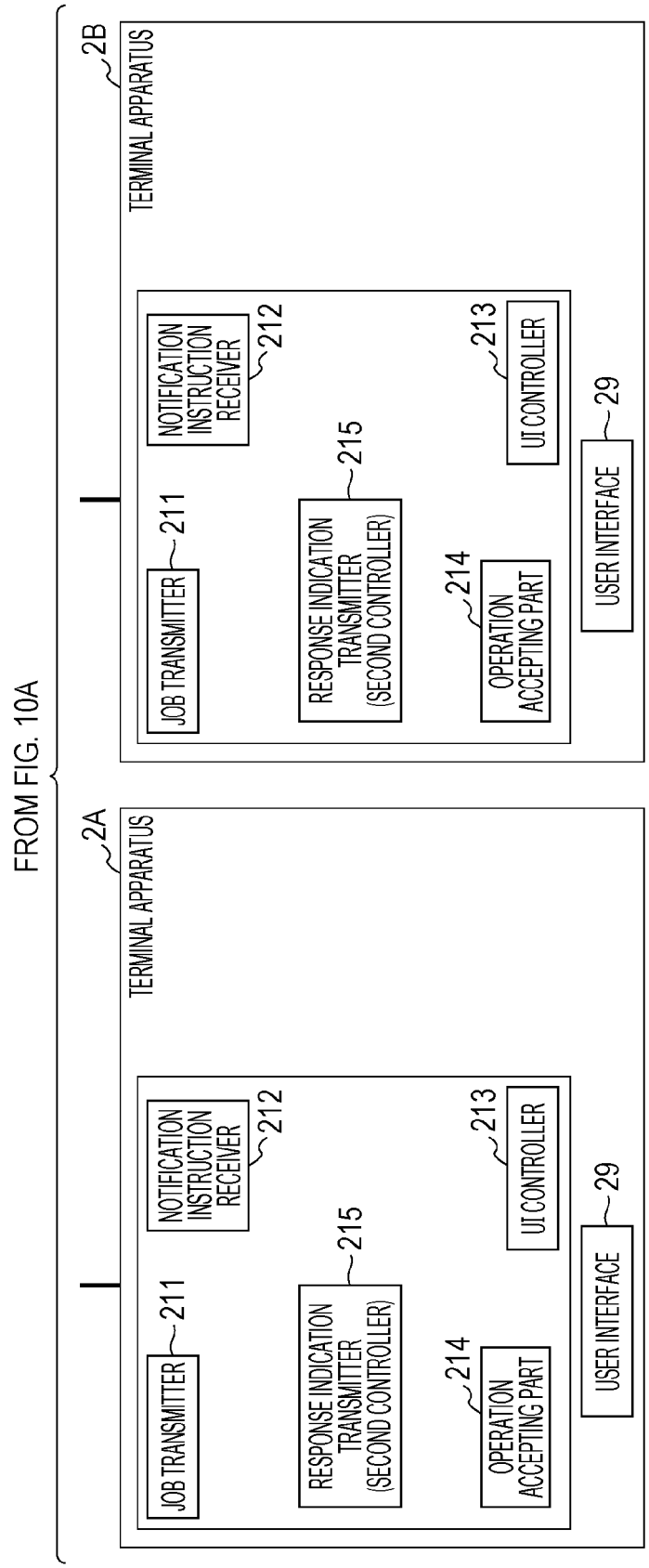

TO FIG. 12B

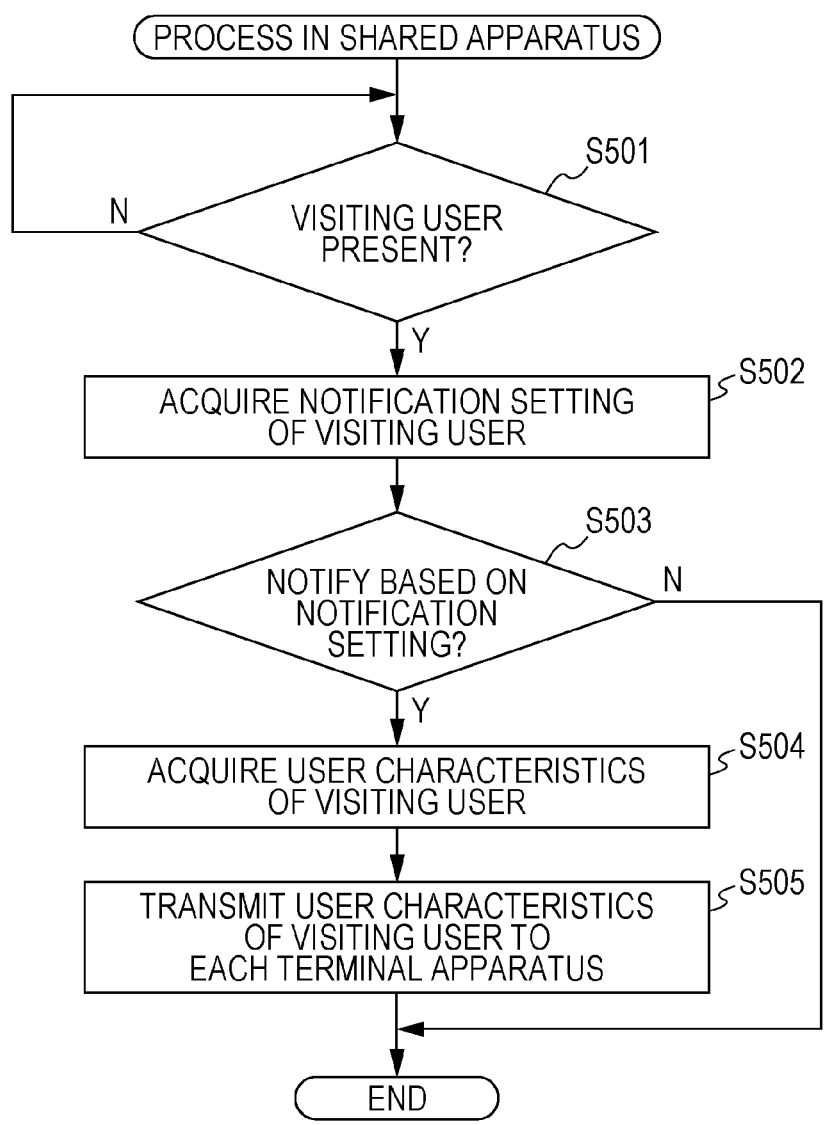

SOCIALIZING SUPPORT APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-055102 filed Mar. 22, 2019.

BACKGROUND

(i) Technical Field

The present disclosure relates to a socializing support apparatus, and a non-transitory computer readable medium.

(ii) Related Art

In shared offices, a multifunction machine is sometimes shared by multiple tenants.

If an apparatus shared by multiple users (to be referred to as "shared apparatus" hereinafter) is installed in a place used by multiple persons, such as a shared office, socializing among users sometimes takes place around the shared apparatus.

It is also true, however, that such socializing is not likely to take place unless, for example, users visit the shared apparatus at the same time by chance.

As a technique related to socializing, International Publication No. 2016/199464 discloses an information processing apparatus related to socializing among users. The information processing apparatus generates a topic for conversation with another person based on the result of comparison between a user's given action, and comparison information related to the action. Unfortunately, this technique does not address the above-mentioned problem.

SUMMARY

Aspects of non-limiting embodiments of the present disclosure relate to a socializing support apparatus that makes it possible to inform a user of the presence of another user who is visiting a shared apparatus.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a socializing support apparatus including a detector that detects presence of a visiting user, the visiting user being a user visiting a shared apparatus, and a first controller that controls notification of first notification information, the notification being provided from a terminal apparatus to a terminal user if a notification condition is satisfied, the notification condition being detection of presence of the visiting user, the first notification information being information indicative of presence of the visiting user, the terminal user being a user of the terminal apparatus different from the visiting user.

BRIEF DESCRIPTION OF THE DRAWINGS

Exemplary embodiments of the present disclosure will be described in detail based on the following figures, wherein:

FIGS. 2A and 2B each illustrate the functional configuration of a socializing support system according to a first exemplary embodiment;

FIG. 8 illustrates an exemplary setting screen used when a terminal user makes his or her own notification frequency settings;

FIG. 9 illustrates an exemplary screen displayed at the time of notification provided by a terminal apparatus;

FIGS. 10A and 10B each illustrate the functional configuration of a socializing support system according to a second exemplary embodiment;

FIG. 13 is a flowchart illustrating a process performed in a shared apparatus according to the third exemplary embodiment;

DETAILED DESCRIPTION

First Exemplary Embodiment

A first exemplary embodiment of the present disclosure will be described below.

Figure 1:
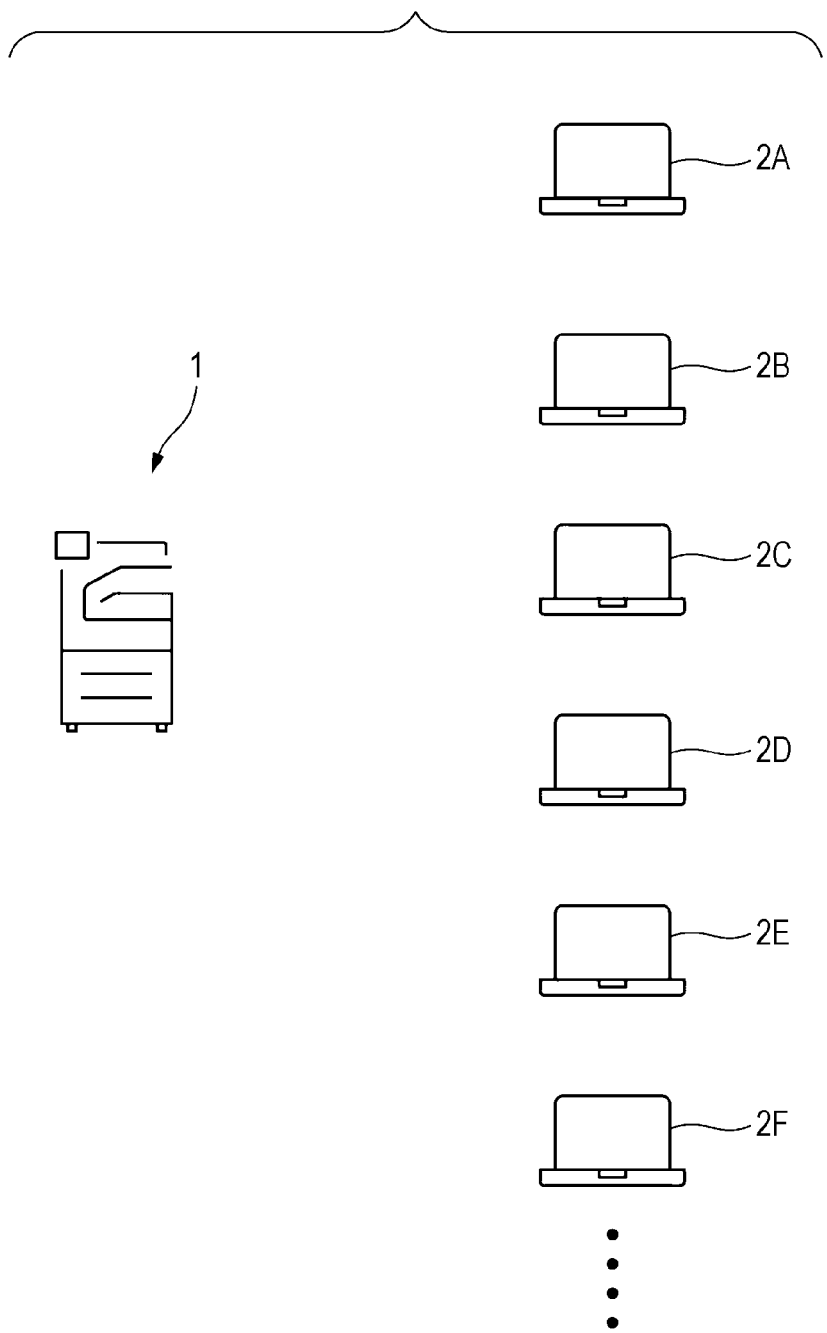
FIG. 1 schematically illustrates a socializing support system.

FIG. 1 schematically illustrates a socializing support system.

As illustrated in FIG. 1, the socializing support system includes a shared apparatus 1, and multiple terminal apparatuses 2A, 2B, and 2C. The terminal apparatuses 2A, 2B, and 2C will be hereinafter referred to simply as terminal apparatus 2 or terminal apparatuses 2 when no particular distinction is made.

The term "visiting user" as used in the following description refers to a user who is visiting the shared apparatus 1. Although the term "visiting" particularly refers to using of the shared apparatus, the term may also refer to cases where, for example, a user stays near the shared apparatus, and the shared apparatus and the user's terminal communicate with each other to enable acquisition of the characteristics of the user. In other words, a user staying near the shared apparatus and whose characteristics are known may be referred to as visiting user.

The term "terminal user" refers to a user of the terminal apparatus 2 who is different from a visiting user.

The shared apparatus 1 is installed in a shared office.

Each terminal apparatus 2 is a terminal apparatus used by a tenant of the shared office.

The terminal apparatus 2 may not be a notebook computer as illustrated in FIG. 1. Alternatively, for example, the terminal apparatus 2 may be a portable terminal apparatus such as a laptop computer, a tablet computer, or a smart phone.

In the first exemplary embodiment, the shared apparatus 1 is an apparatus that forms an image on a medium such as paper (i.e., an image forming apparatus).

Further, the shared apparatus 1 is a multifunction machine, and includes, in addition to functions such as printing and copying, multiple functions such as a scanner function and a FAX sending and receiving function.

It is to be noted, however, that the shared apparatus according to an exemplary embodiment of the present disclosure may not necessarily be such a multifunction machine but may be any apparatus used by multiple users, for example, a PC or a tablet computer.

The shared apparatus 1 is a shared apparatus, that is, an apparatus shared by multiple users who are tenants of the shared office. The shared apparatus 1 is installed in a shared space in the shared office.

Each user has an individual ID for using the shared apparatus 1. Each user can be authenticated by holding an ID card over a card reader of the shared apparatus 1, entering the user's name on the panel of the shared apparatus 1, or other methods. When authenticated, the user becomes able to use various functions of the shared apparatus 1.

The following describes the procedure in using the printing function of the shared apparatus 1.

First, a user makes, on the terminal apparatus 2 or another terminal apparatus, an operation for performing printing at the shared apparatus 1. In response to the above-mentioned operation, the terminal apparatus 2 or the other terminal generates a print job, and transmits the print job to the shared apparatus 1. The shared apparatus 1 receives the print job, and temporarily holds the print job. Subsequently, the user visits the shared apparatus 1, authenticates himself or herself to the shared apparatus 1, and operates the shared apparatus 1. The shared apparatus 1 thus starts execution of the print job, and printing is performed in accordance with the print job.

Functional Configuration of Socializing Support System

FIGS. 2A and 2B each illustrate the functional configuration of the socializing support system according to the first exemplary embodiment.

Socializing Support Apparatus

As illustrated in FIGS. 2A and 2B, the socializing support system according to the first exemplary embodiment includes a socializing support apparatus 3 in addition to the shared apparatus 1 and the terminal apparatuses 2.

The socializing support apparatus 3 includes a user characteristic manager 39L, a desired characteristic manager 39M, and a frequency setting manager 39N, which will be hereinafter referred to simply as manager 39 or managers 39 when no particular distinction is made.

The manager 39 performs management (including storage) of user-related information. The manager 39 includes a storage device such as a hard disk drive (HDD) or a solid state drive (SSD).

The user characteristic manager 39L manages user characteristic information. User characteristic information means information representing user characteristics.

User characteristics refer to properties possessed by the user, examples of which include industry type, job type, qualifications, and specialty field. It is to be noted that, as will be described later, user characteristics may include characteristics derived from information such as schedule information or various history information (such as purchase history, visit history, and lodging history).

The desired characteristic manager 39M manages desired characteristic information. Desired characteristic information means information representing characteristics for which a user desires socializing. By the term "characteristics for which a user desires socializing", it is meant what person with what characteristics the user wants to socialize with.

The characteristics in this case correspond to characteristics represented by user characteristic information registered into a user characteristic registerer 318L.

The frequency setting manager 39N manages notification frequency settings. Notification frequency settings refer to settings related to the frequency of notification. This information is used by a notification determiner 315 in performing determination of whether to provide notification (to be sometimes referred to as "notification determination" hereinafter) as will be described later.

The socializing support system includes, as its functional components, the user characteristic registerer 318L, a desired characteristic registerer 318M, and a frequency setting registerer 318N, which will be hereinafter referred to simply as registerer 318 or registerers 318 when no particular distinction is made.

The user characteristic registerer 318L registers user characteristic information into the user characteristic manager 39L.

Registration by the user characteristic registerer 318L is basically performed after a registration operation made by the user or a registration operation made by the system administrator is accepted. Examples of registration operations include a selection from a pull-down or other menu, and entry of text. It is to be noted that, alternatively, registration by the user characteristic registerer 318L may be performed automatically as will be described later.

The desired characteristic registerer 318M registers desired characteristic information into the desired characteristic manager 39M.

Registration by the desired characteristic registerer 318M is basically performed after a registration operation made by the user or a registration operation made by the system administrator is accepted. Examples of registration operations include a selection from a pull-down or other menu, and entry of text. It is to be noted that, alternatively, registration by the desired characteristic registerer 318M may be performed automatically as will be described later.

The frequency setting registerer 318N registers notification frequency settings into the frequency setting registerer 318N.

Registration by the frequency setting registerer 318N is basically performed after a registration operation made by the user or a setting operation made by the system administrator is accepted. FIG. 8 illustrates an exemplary setting screen used when a terminal user makes his or her own notification frequency settings.

As illustrated in FIG. 8, the "Desired Characteristics" column shows each characteristic for which socializing is desired by the terminal user himself or herself. For each desired characteristic, the frequency of notification can be set by selection from a pull-down menu.

If the notification frequency is being set to "Every Time", then for a case where the visiting user has the corresponding desired characteristic (Characteristic A), a determination not to provide notification (to be sometimes referred to as "no-notification determination" hereinafter) is not made when notification determination based on the notification frequency setting is performed.

If the notification frequency is being set to "Only For First Time", then for a case where the visiting user has the corresponding desired characteristic (Characteristic B), if the notification that the visiting user has Characteristic B has been provided in the past, a no-notification determination is made when notification determination based on the notification frequency setting is performed.

If the notification frequency is being set to "Once Every Week", then for a case where the visiting user has the corresponding desired characteristic (Characteristic C), if the notification that the visiting user has Characteristic C has been provided in the past in the same week, a no-notification determination is made when notification determination based on the notification frequency setting is performed.

If the notification frequency is being set to "Only When Ticked", then for a case where the visiting user has the corresponding desired characteristic (Characteristic D), a no-notification determination is not made when notification determination is performed based on the notification frequency setting if the checkbox in the leftmost column is being ticked, and a no-notification determination is made if this checkbox is not being ticked.

The socializing support apparatus 3 includes, as its functional components, an authentication information receiver 311, a visiting-user notification setting acquirer 312, a visiting-user-characteristic acquirer 313, a terminal-user-characteristic acquirer 314L, a terminal user-desired characteristic acquirer 314M, a terminal-user frequency setting acquirer 314N, the notification determiner 315, a notification information creator 316, and a notification signal transmitter 317.

A description of these functional parts will be provided later during the description of a process illustrated in the flowchart of FIG. 4.

Further, the socializing support system includes an operation accepting part 214, and a response indication transmitter 215 as its functional components. The operation accepting part 214 and the response indication transmitter 215 are provided as functional components of each terminal apparatus 2.

The operation accepting part 214 accepts an operation made on a terminal apparatus with which notification has been provided.

The response indication transmitter 215 controls a second notification. The second notification is a notification of response information made in response to an operation accepted by the operation accepting part 214. The second notification is provided to a visiting user from the shared apparatus 1 or a portable terminal apparatus (which may be an apparatus other than the terminal apparatus 2) of the visiting user.

Figure 7:
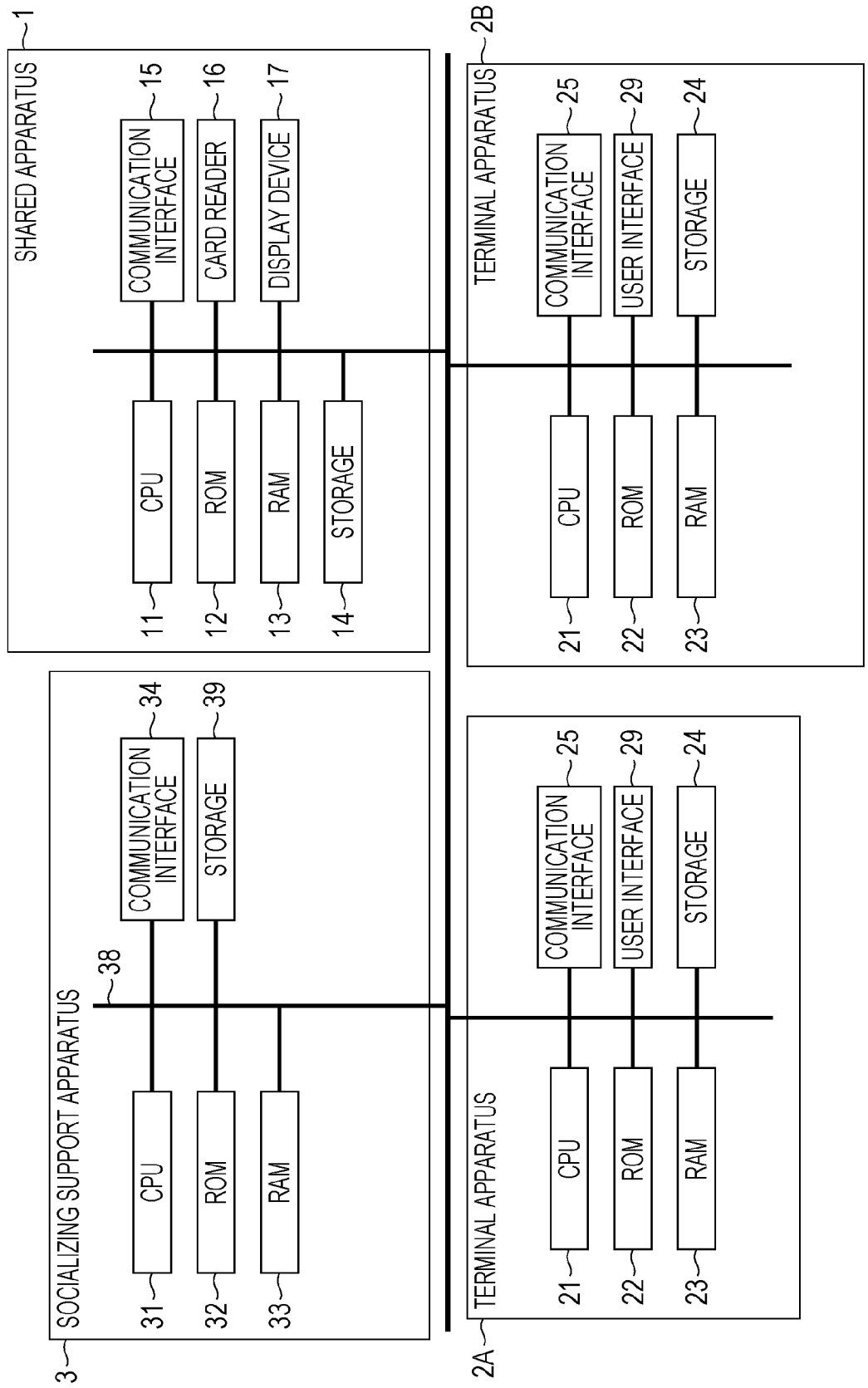
FIG. 7 is a block diagram illustrating the hardware configuration of the socializing support system according to the first exemplary embodiment.

FIG. 7 is a block diagram illustrating the hardware configuration of the socializing support system according to the first exemplary embodiment.

As illustrated in FIG. 7, the socializing support apparatus 3 includes a central processing unit (CPU: processor) 31, a read only memory (ROM) 32, a random access memory (RAM) 33, a storage 39, and a communication interface 34. These components are interconnected via a bus 38 in a manner that allows their communication with each other.

The CPU 31, which is a central processing unit, performs processes such as executing various programs and controlling various parts. That is, the CPU 31 reads a program from the ROM 32 or the storage 39, and executes the program with the RAM 33 used as a work area. In accordance with the program stored in the ROM 32 or the storage 39, the CPU 31 controls the various components mentioned above and performs various arithmetic processing. In the first exemplary embodiment, a program for supporting socializing is stored in the ROM 32 or the storage 39.

The ROM 32 stores various programs and various data. The RAM 33 temporarily stores a program or data as a work area. The storage 39, which is implemented as an HDD or SSD, stores various programs including an operating system, and various data.

The communication interface 34 is an interface used for communication of the socializing support apparatus 3 with another apparatus or device. For example, Ethernet (registered trademark), FDDI, Wi-Fi (registered trademark), or other such standard is employed.

The functional parts described above as functional components of the socializing support apparatus 3 are implemented by the CPU 31 reading and executing the program used for supporting socializing that is stored in the ROM 32 or the storage 39. The program may be provided as a program stored on a non-transitory storage medium.

Additionally, although the shared apparatus 1 and the terminal apparatus 2 includes the hardware components illustrated in FIG. 7 as well as the functional components illustrated in FIGS. 2A and 2B, a detailed description in this regard is not given here.

Processing Procedure

The following describes the procedure of processing performed in the socializing support system according to the first exemplary embodiment.

Process in Shared Apparatus

Figure 3:
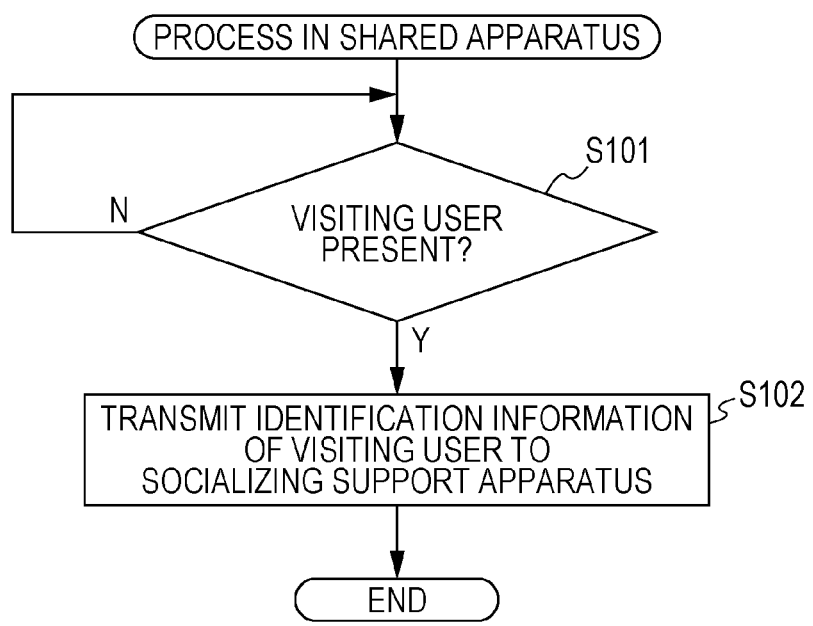
FIG. 3 is a flowchart illustrating a process performed in a shared apparatus according to the first exemplary embodiment.

FIG. 3 is a flowchart illustrating a process performed in the shared apparatus 1.

At step S101, the shared apparatus 1 acting as an authenticator 111 determines whether a visiting user is present. If no visiting user is determined to be present, the shared apparatus 1 repeats step S101. If a visiting user is determined to be present, the shared apparatus 1 proceeds to step S102.

The authenticator 111 determines a visiting user to be present if a user is performing authentication.

At step S102, the shared apparatus 1 acting as an authentication information transmitter 112 transmits authentication information including identification information of the visiting user to the socializing support apparatus 3. The shared apparatus 1 then ends the process.

Process in Socializing Support Apparatus

Figure 4:
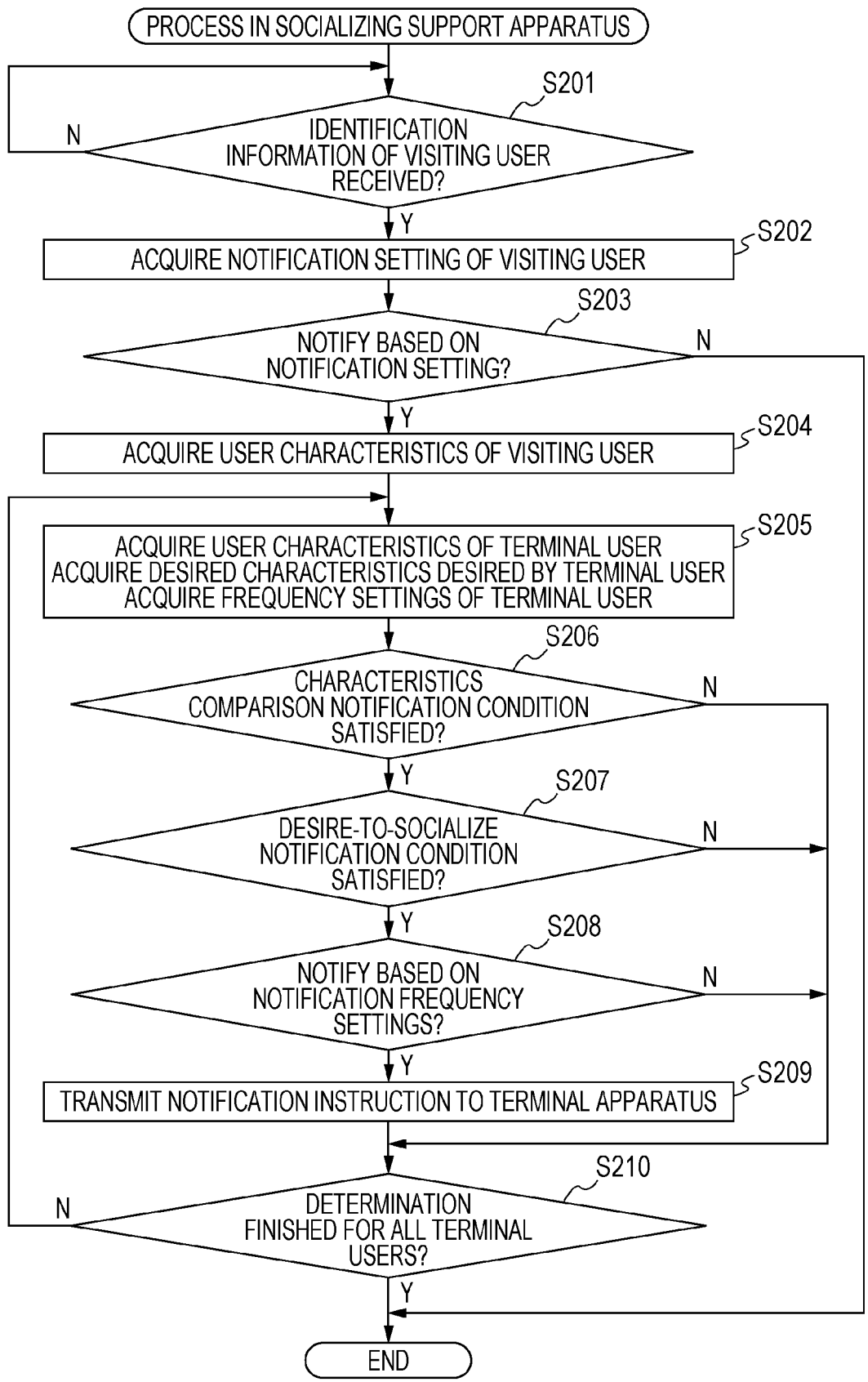
FIG. 4 is a flowchart illustrating a process performed in a socializing support apparatus according to the first exemplary embodiment.

FIG. 4 is a flowchart illustrating a process performed in the socializing support apparatus 3.

At step S201, the socializing support apparatus 3 acting as the authentication information receiver 311 determines whether authentication information including identification information of a visiting user has been received. The socializing support apparatus 3 repeats step S201 if it is determined that authentication information has not been received.

The socializing support apparatus 3 proceeds to step S202 if it is determined that authentication information has been received.

The information received by the authentication information receiver 311 at this time is information transmitted by the authentication information transmitter 112 of the shared apparatus 1. As described above, the shared apparatus 1 transmits authentication information to the socializing support apparatus 3 when a visiting user is determined to be present. Accordingly, it can be said that the authentication information received by the authentication information receiver 311 of the socializing support apparatus 3 represents "information indicative of a user visiting the shared apparatus 1". The authentication information receiver 311 corresponds to "detector" according to an exemplary embodiment of the present disclosure.

At step S202, the socializing support apparatus 3 acting as the visiting-user notification setting acquirer 312 acquires the notification setting of the visiting user.

The notification setting of the visiting user refers to a setting as to whether notification is to be provided. The notification setting is used by the notification determiner 315 in performing notification determination.

In the first exemplary embodiment, a user attempting to print at the shared apparatus 1 operates his or her own terminal apparatus 2 or other such apparatus to transmit a print job to the shared apparatus 1. For cases such as when the content to be printed is highly confidential, the user is able to, when making an operation for transmitting a print job, make a setting such that even when the user visits the shared apparatus 1, another user will not be notified of the visit. That is, the user is able to make a notification setting (i.e., a setting as to whether or not notification is performed) through an operation that the user makes when transmitting a print job.

That is, when transmitting a print job, a job transmitter 211 of the terminal apparatus 2 transmits the notification setting to an external apparatus or device (which is the socializing support apparatus 3 in the first exemplary embodiment) in addition to the print job.

The visiting-user notification setting acquirer 312 of the socializing support apparatus 3 acquires the notification setting transmitted from the terminal apparatus 2.

At step S203, the socializing support apparatus 3 acting as the notification determiner 315 determines whether or not to provide notification, based on the notification setting of the visiting user. If it is determined not to provide notification (step S203: NO), the socializing support apparatus 3 ends the process. If it is determined to provide notification (step S203: YES), the socializing support apparatus 3 proceeds to step S204.

For example, if, when making an operation for transmitting a print job (specifically, an operation based on a print driver), the visiting user has indicated that the content to be printed is highly confidential, the notification determiner 315 determines not to provide notification.

At step S204, the socializing support apparatus 3 acting as the visiting-user-characteristic acquirer 313 acquires user characteristic information of the visiting user from the user characteristic manager 39L.

At step S205, the socializing support apparatus 3 performs the following operations. The socializing support apparatus 3 acting as the terminal-user-characteristic acquirer 314L acquires user characteristic information of one of multiple terminal users from the user characteristic manager 39L. The socializing support apparatus 3 acting as the terminal user-desired characteristic acquirer 314M acquires desired characteristic information of the terminal user from the desired characteristic manager 39M. Further, the socializing support apparatus 3 acting as the terminal-user frequency setting acquirer 314N acquires the notification frequency settings of the terminal user from the frequency setting manager 39N. The term "multiple terminal users" as used herein refers to multiple users different from the visiting user and each using the terminal apparatus 2.

At step S206, the socializing support apparatus 3 acting as the notification determiner 315 determines, based on the user characteristics of the visiting user and the user characteristics of the terminal user, whether a notification condition (characteristics comparison notification condition) is satisfied.

In the first exemplary embodiment, the characteristics comparison notification condition is that the industry type indicated by the user characteristic information of the visiting user does not match the industry type indicated by the user characteristic information of the terminal user.

If the characteristics comparison notification condition is not satisfied (which is, according to the first exemplary embodiment, if the industry types of the two users match) (step S206: NO), the socializing support apparatus 3 proceeds to step S210.

If the characteristics comparison notification condition is satisfied (which is, according to the first exemplary embodiment, if the industry types of the two users do not match) (step S206: YES), the socializing support apparatus 3 proceeds to step S207.

At step S207, the socializing support apparatus 3 acting as the notification determiner 315 determines, based on the user characteristic information of the visiting user and the desired characteristic information of the terminal user, whether a notification condition (desire-to-socialize notification condition) is satisfied.

In the first exemplary embodiment, the desire-to-socialize notification condition is that one or more characteristics represented by the user characteristic information of the visiting user match at least one of one or more characteristics represented by the desired characteristic information of the terminal user.

If the desire-to-socialize notification condition is not satisfied (which is, according to the first exemplary embodiment, if one or more characteristics of the visiting user match none of one or more desired characteristics desired by the terminal user) (step S207: NO), the socializing support apparatus 3 proceeds to step S210.

If the desire-to-socialize notification condition is satisfied (which is, according to the first exemplary embodiment, if one or more characteristics of the visiting user match at least one of one or more desired characteristics desired by the terminal user) (step S207: YES), the socializing support apparatus 3 proceeds to step S208.

At step S208, the socializing support apparatus 3 acting as the notification determiner 315 determines whether or not to provide notification, based on the notification frequency settings of the terminal user.

If it is determined not to provide notification (step S208: NO), the socializing support apparatus 3 proceeds to step S210.

If it is determined to provide notification (step S208: YES), the socializing support apparatus 3 proceeds to step S209.

At step S209, the socializing support apparatus 3 acting as the notification signal transmitter 317 transmits, to the terminal apparatus 2, a notification instruction, which is an instruction to provide notification (a signal for providing a first notification).

As will be described later, the terminal apparatus 2 that has received the notification instruction performs notification (first notification) via a user interface 29. Accordingly, it can be said that the notification signal transmitter 317 of the socializing support apparatus 3 controls the provision of notification information (first notification information) indicative of the presence of the visiting user from the terminal apparatus to the terminal user. Therefore, the notification signal transmitter 317 corresponds to "first controller" according to an exemplary embodiment of the present disclosure.

At step S210, the socializing support apparatus 3 determines whether the steps after step S205 have been executed for all of terminal users.

If the steps after step S205 have not been executed for all of terminal users (step S210: NO), the socializing support apparatus 3 repeats the process from step S205 onward for any terminal user for whom the above-mentioned steps have not yet been executed.

If the steps after step S205 have been executed for all of terminal users (step S210: YES), the socializing support apparatus 3 ends the process.

Process in Terminal Apparatus

Figure 5:
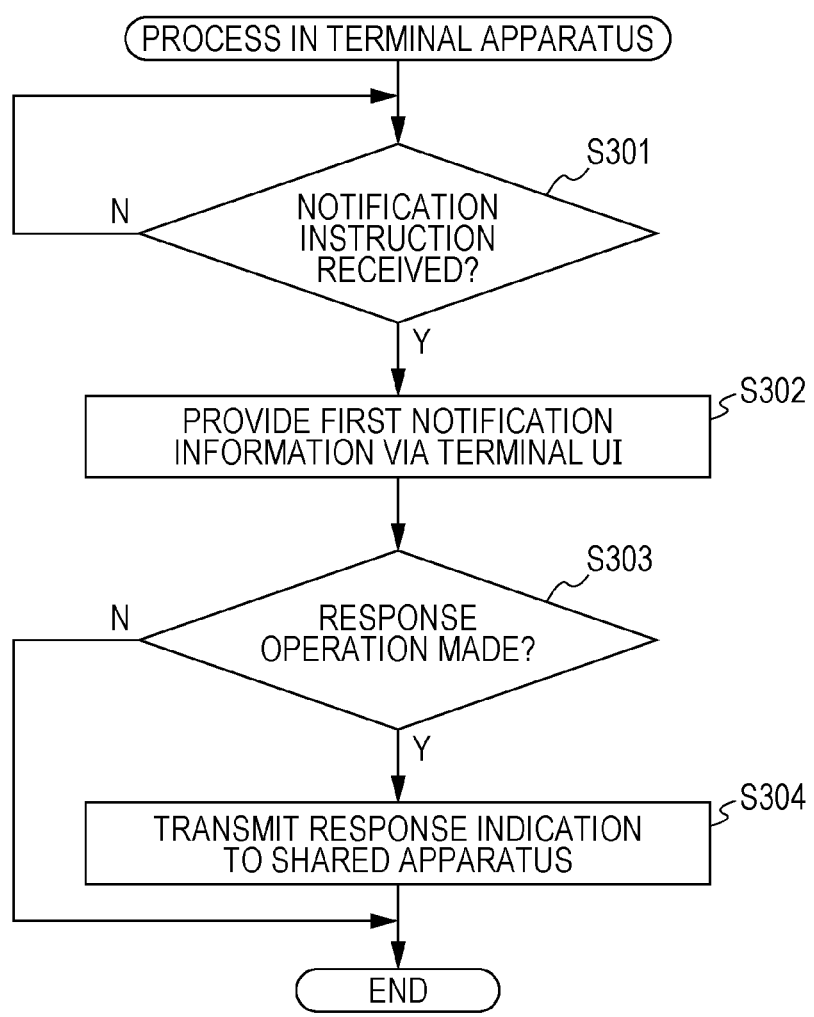
FIG. 5 is a flowchart illustrating a process performed in each terminal apparatus according to the first exemplary embodiment.

FIG. 5 is a flowchart illustrating a process performed in each terminal apparatus 2.

At step S301, the terminal apparatus 2 acting as a notification instruction receiver 212 determines whether a notification instruction has been received from the socializing support apparatus 3.

If a notification instruction has not been received (step S301: NO), the terminal apparatus 2 repeats step S301.

If a notification instruction has been received (step S301: YES), the terminal apparatus 2 proceeds to step S302.

At step S302, the terminal apparatus 2 acting as a UI controller 213 controls the user interface 29 to provide first notification information to the terminal user. Specifically, the terminal apparatus 2 acting as the UI controller 213 controls a display device, which represents an example of the user interface 29, to display first notification information. An exemplary display screen displayed on the display device is illustrated in FIG. 9. The display screen in FIG. 9 displays an indication of the presence of a given visiting user. The display screen further displays the characteristics of the visiting user. The information (first notification information) of which notification is provided to the terminal user is created by the notification information creator 316 of the socializing support apparatus 3.

At step S303, the terminal apparatus 2 acting as the operation accepting part 214 determines whether a response operation has been made.

As illustrated in FIG. 9, the screen displayed at the time of notification provided by the terminal apparatus 2 displays, together with a text "Send a message to this person?", the following buttons as GUI buttons: "I'll be there right now"; and "I want to meet you later". In the first exemplary embodiment, a response operation refers to depression of such a button.

If no response operation has been made (e.g., if no button has been depressed within a predetermined period of time or if no button has been depressed within the period of time during which the visiting user is being authenticated) (step S303: NO), the terminal apparatus 2 ends the process.

If a response operation has been made (step S303: YES), the terminal apparatus 2 proceeds to step S304.

At step S304, the terminal apparatus 2 acting as the response indication transmitter 215 transmits, to the shared apparatus 1, a response indication (a signal for providing a second notification) according to the response operation.

When one of the buttons illustrated in FIG. 9 is depressed by the terminal user, due to a response indication transmitted by the response indication transmitter 215, the text "I'll be there right now" or "I want to meet you later" is displayed on a display device 17 of the shared apparatus 1. The response indication transmitter 215 corresponds to "second controller" according to an exemplary embodiment of the present disclosure.

Alternatively, the response indication transmitter 215 may transmit a response indication (a signal for providing a second notification) to a portable terminal apparatus (which may be an apparatus different from the terminal apparatus 2) of the visiting user, and the visiting user may be notified of response information (the text "I'll be there right now" or "I want to meet you later" in the above-mentioned example) not from the shared apparatus 1 but from the portable terminal apparatus of the visiting user.

The first notification information in the foregoing description may be information indicative of the presence of a given visiting user and not indicative of the characteristics of the visiting user.

Alternatively, however, the first notification information may be information indicative of the presence of a given visiting user and also indicative of the characteristics of the visiting user.

In the first exemplary embodiment, if the notification condition (characteristics comparison notification condition) that the type of industry of a visiting user and the type of industry of a terminal user do not match is satisfied, first notification information indicative of the presence of the visiting user is provided to the terminal user. Such notification can give rise to cross-industry socializing.

Although the first notification information in this case may include only an indication of the presence of a given visiting user, the first notification information may further include one or more of (1) to (3) below:

(1) an indication that the visiting user works in a different type of industry;

(2) the industry type of the visiting user; and (3) other characteristics of the visiting user.

In the first exemplary embodiment, if the visiting user's industry type and the terminal user's industry type match, no notification is provided to the terminal user. In other words, no match between the visiting user's industry type and the terminal user's industry type is defined as the necessary condition for providing notification. From the viewpoint of the visiting user, this keeps other users who work in the same type of industry from knowing that he or she is visiting the shared apparatus. This prevents, for example, leakage of information to users working in the same type of industry.

In the first exemplary embodiment, if a notification condition based on the user characteristic information of a visiting user and the desired characteristic information of a terminal user (i.e., desire-to-socialize notification condition) is satisfied, notification information indicative of the presence of the visiting user is provided to the terminal user. From the viewpoint of the terminal user, this means that the terminal user is notified when a user having characteristics for which he or she desires socializing is visiting the shared apparatus.

Although the first notification information in this case may include only an indication of the presence of a given visiting user, the first notification information may further include one or both of the followings:

(1) an indication that the desire-to-socialize notification condition is satisfied; and (2) the characteristics of the visiting user.

Figure 15:
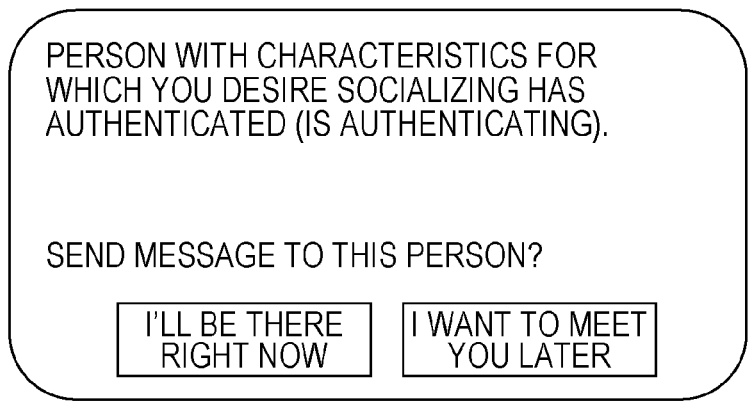
FIG. 15 illustrates an exemplary screen displayed at the time of notification provided by a terminal apparatus.
Figure 16:
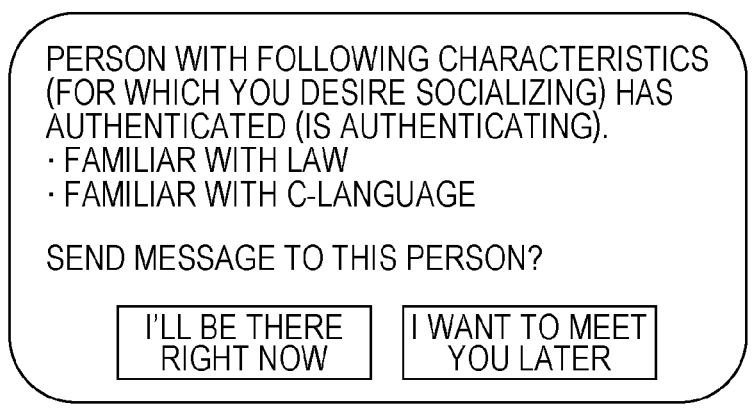
FIG. 16 illustrates an exemplary screen displayed at the time of notification provided by a terminal apparatus.

For example, the notification information displayed as illustrated in FIG. 15 is information indicative of (1) and not indicative of (2). For example, the notification information displayed as illustrated in FIG. 9 is information not indicative of (1) and indicative of (2). For example, the notification information displayed as illustrated in FIG. 16 is information indicative of (1) and indicative of (2).

With the socializing support system according to the first exemplary embodiment, the notification frequency settings of the terminal user are set such that the same notification is not provided multiple times within a predetermined period of time. In other words, with the socializing support system according to the first exemplary embodiment, the terminal user is allowed to, by setting the notification frequency settings, change the notification condition such that the same notification is not provided multiple times within a predetermined period of time.

The term "same notification" as used herein refers to a notification that is identical in terms of the visiting user and the information being notified. Accordingly, for a case where User A is the visiting user, even if a notification about User A has been previously provided within the same predetermined period of time of interest, if user characteristic information registered with respect to User A has been modified, and there has been a change to the characteristics of User A of which notification is to be provided as notification information, then such notification is not regarded as the "same notification" and thus the notification is provided to the terminal user.

In the first exemplary embodiment, examples of characteristics registered into the manager 39 include at least one of industry type, job type, and specialty field. In other words, at least one of industry type, job type, and specialty field can be registered as a characteristic into the manager 39. Consequently, the resulting socializing support system is suited for an apparatus shared by users wishing to socialize from the viewpoint of business development (e.g., a shared apparatus in a shared office).

Figure 17:
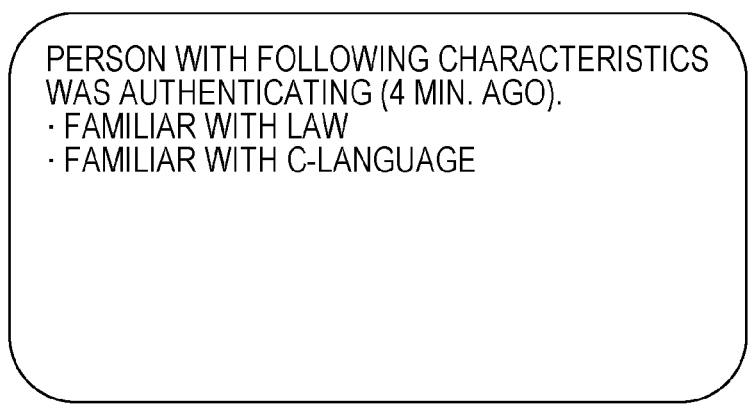
FIG. 17 illustrates an exemplary screen displayed at the time of notification provided by a terminal apparatus.

The above-mentioned first notification information may be provided by showing a display that continues only for the period of time during which a visiting user is present. In other words, once the period of time during which a visiting user is present (which in the first exemplary embodiment is the period of time during which the user is performing authentication) passes, then, for example, the display as illustrated in FIG. 9 may disappear. Alternatively, once the period of time during which a visiting user is present (which in the first exemplary embodiment is the period of time during which the user is performing authentication) passes, then the display may be changed to the display as illustrated in FIG. 17. It can be said that the notification information provided by showing the display illustrated in FIG. 17 is information indicating that the visiting user was present until just now.

New Information

With the socializing support system according to the first exemplary embodiment, in some cases, the user characteristic registerer 318L registers, as a characteristic, new information available for the user.

The socializing support system according to the first exemplary embodiment includes a new information acquirer 313S as its functional component. The new information acquirer 313S acquires new information available for a visiting user. For example, the new information acquirer 313S acquires new information available for a visiting user from the RSS of the website of the company to which the visiting user belongs, the personal website of the visiting user, or other such information.

If new information has been acquired for a visiting user, the user characteristic registerer 318L registers a characteristic "new information available" for the visiting user. It is assumed that desired characteristics that can be registered by the desired characteristic registerer 318M also include a desired characteristic "new information available". This will be described below with specific examples given for the ease of understanding.

It is assumed that the user characteristic registerer 318L has previously registered a desired characteristic "new information available" with respect to User B into the user characteristic manager 39L.

A case is now considered where, under this situation, User A who has previously updated his or her own website is authenticated at the shared apparatus 1.

Then, the new information acquirer 313S attempts to acquire new information available for User A. If new information available for User A as a visiting user is acquired, the user characteristic registerer 318L registers a characteristic "new information available" with respect to User A into the user characteristic manager 39L.

Next, the visiting-user-characteristic acquirer 313 acquires the characteristic "new information available", as a characteristic of User A who is a vising user.

The terminal-user-characteristic acquirer 314L acquires a characteristic "new information available", as a desired characteristic desired by User B who is a terminal user.

The notification determiner 315 determines, based on the characteristic "new information available" of User A and the desired characteristic "new information available" desired by User B, that the desire-to-socialize notification condition (the desire-to-socialize notification condition according to the first exemplary embodiment) is satisfied. Consequently, notification information is provided by the terminal apparatus 2 of User B, unless a determination not to provide notification is made by some other notification determination process.

Although the notification information in this case may include only an indication of the presence of a given visiting user, the notification information may further include one or more of (1) to (3) below:

(1) an indication of the presence of new information available for the visiting user;

(2) descriptions of the new information (e.g., the URL of the website of the company to which the visiting user belongs, or the URL of the personal website of the visiting user); and (3) other characteristics of the visiting user (i.e., characteristics other than the characteristic "new information available").

The acquired new information available for the visiting user may not be used in the notification determination performed by the notification determiner 315, but may be used only for creation of notification information by the notification information creator 316. Further, notification information provided when a notification condition different from the above-mentioned notification condition is satisfied may be information indicative of the acquired new information available for the visiting user.

Degree of Match Between Schedule Items

The socializing support system according to the first exemplary embodiment may be modified such that the degree of match between schedule items is used in performing processes such as notification determination and creation of notification information. This will be described below with specific examples given for the ease of understanding.

It is assumed that both User A and User B have registered, with an event management system of a shared office, their intention to attend a shared office event scheduled on Month X Day X.

In this case, the user characteristic registerer 318L acts in conjunction with the event management system of the shared office to register, into the user characteristic manager 39L, a characteristic "scheduled to attend a shared office event on Month X Day X" with respect to User A and User B as a characteristic extracted from the schedule of each user.

A case is now considered where, under this situation, User A is authenticated at the shared apparatus 1.

The visiting-user-characteristic acquirer 313 acquires the characteristic "scheduled to attend a shared office event on Month X Day X" as a characteristic of User A who is a visiting user.

The terminal-user-characteristic acquirer 314L acquires the characteristic "scheduled to attend a shared office event on Month X Day X" as a characteristic of User B who is a terminal user. Since the two users have the same characteristic "scheduled to attend a shared office event on Month X Day X", the notification determiner 315 determines that the characteristics comparison notification condition (for which the sufficient condition is defined in accordance with this modification as a match between schedule items extracted as characteristics) is satisfied. Consequently, notification information is provided by the terminal apparatus 2 of User B, unless a determination not to provide notification is made by some other notification determination process.

Although the notification information in this case may include only an indication of the presence of a given visiting user, the notification information may further include one or more of (1) to (3) below:

(1) an indication of a match between a schedule item of the visiting user and a schedule item of the terminal user;

(2) descriptions of each matching schedule item (e.g., schedule name, or the URL of a website describing schedule information); and (3) other characteristics of the visiting user.

The notification determiner 315 may determine to provide notification if the degree of match between schedule items is greater than or equal to a threshold, and may determine not to provide notification if the degree of match between schedule items is less than the threshold. An exemplary case where schedule items do not match up completely but the degree of their match is greater than or equal to a threshold is when a visiting user has a schedule item "go to XX at 15:00" and a terminal user has a schedule item "go to XX at 15:30" (i.e., when the two users go to the same destination but at slightly different times).

A schedule item extracted as a characteristic may not be used for notification determination performed by the notification determiner 315, but may be used only for creation of notification information by the notification information creator 316. Further, notification information provided if a notification condition different from the above-mentioned notification condition is satisfied may be information indicative of a schedule item extracted as a characteristic.

The foregoing description of the present disclosure is directed to the case where the user characteristic registerer 318L automatically extracts a schedule item from a schedule management system as a characteristic, and automatically registers the schedule. However, this is not to be construed in a limiting sense. For instance, the socializing support system may be adapted such that, after a schedule item is automatically extracted as a characteristic from the schedule management system, the user is allowed to choose whether the schedule item is registered into the user characteristic manager 39L.

Characteristics Derived from Purchase History

With the socializing support system according to the first exemplary embodiment, a user's purchase history may be used in performing processes such as notification determination and creation of notification information. This will be described below with specific examples given for the ease of understanding.

It is assumed that User A has purchased a cosmetic product of Company F on a given online shopping site.

Then, the user characteristic registerer 318L references a purchase history representing account information of User A on the online shopping site, and registers, into the user characteristic manager 39L, a characteristic "knowledgeable or experienced about cosmetic products of Company F" with respect to User A.

It is assumed that at this time, a desired characteristic "knowledgeable or experienced about cosmetic products of Company F" is registered in the desired characteristic manager 39M with respect to User B.

A case is now considered where, under this situation, User A is authenticated at the shared apparatus 1.

The visiting-user-characteristic acquirer 313 acquires a characteristic "knowledgeable or experienced about cosmetic products of Company F", as a characteristic of User A who is a visiting user.

The terminal-user-characteristic acquirer 314L acquires a desired characteristic "knowledgeable or experienced about cosmetic products of Company F", as a desired characteristic desired by User B who is a terminal user.

Based on a characteristic "purchased a cosmetic product of Company F online" of User A, and the desired characteristic "knowledgeable or experienced about cosmetic products of Company F" desired by User B, the notification determiner 315 determines that the desire-to-socialize notification condition (the desire-to-socialize notification condition according to the first exemplary embodiment) is satisfied. Consequently, notification information is provided by the terminal apparatus 2 of User B, unless a determination not to provide notification is made by some other notification determination process.

Although the notification information in this case may include only an indication of the presence of a given visiting user, the notification information may further include one or more of (1) to (3) below:

(1) a desired characteristic desired by the terminal user that a characteristic derived from a visiting user's purchase history has matched;

(2) a purchase history from which a visiting user's characteristic matching a desired characteristic desired by the terminal user has been derived; and (3) other characteristics of the visiting user.

For example, notification information provided by showing a display "A person knowledgeable or experienced about cosmetic products of Company F has authenticated." represents notification information indicative of (1) and not indicative of (2).

For example, notification information provided by showing a display "A person who recently purchased a cosmetic product of Company F has authenticated." represents notification information not indicative of (1) and indicative of (2).

By not including the purchase history of a visiting user in the notification information to be displayed, socializing is promoted while protecting the privacy of the visiting user. By contrast, by including the purchase history of a visiting user in the notification information to be displayed, more specific conversation is promoted.

A characteristic derived from a purchase history may not be used for notification determination performed by the notification determiner 315, but may be used only for creation of notification information by the notification information creator 316. Further, notification information provided if a notification condition different from the above-mentioned notification condition is satisfied may be information indicative of a characteristic derived from a purchase history or indicative of a purchase history.

The foregoing description of the present disclosure is directed to the case where, after a characteristic (i.e., a characteristic "knowledgeable or experienced about cosmetic products of Company F") is automatically extracted from a purchase history, the extracted characteristic is automatically registered into the user characteristic manager 39L. However, this is not to be construed in a limiting sense. For example, the socializing support system may be adapted such that, after a characteristic is extracted from a purchase history, the corresponding user is able to determine whether to register the characteristic as his or her own characteristic.

Booking History as Characteristic

The socializing support system according to the first exemplary embodiment may be adapted such that the booking history of a user is used in performing processes such as notification determination and creation of notification information. The term booking in this case refers to, for example, booking of accommodations or restaurants. This will be described below with specific examples given for the ease of understanding.

It is assumed that User A has booked a hotel in XX city at a given hotel booking site.

The visiting-user-characteristic acquirer 313 references a booking history representing account information of User A on the hotel booking site, and registers, into the user characteristic manager 39L, a characteristic "knowledgeable or experienced about XX city" with respect to User A.

It is assumed that at this time, a desired characteristic "knowledgeable or experienced about XX city" is registered in the desired characteristic manager 39M with respect to User B.

A case is now considered where, under this situation, User A is authenticated at the shared apparatus 1.

The visiting-user-characteristic acquirer 313 acquires a characteristic "knowledgeable or experienced about XX city", as a characteristic of User A who is a visiting user.

The terminal-user-characteristic acquirer 314L acquires a desired characteristic "knowledgeable or experienced about XX city", as a desired characteristic desired by User B who is a terminal user.

Based on a characteristic "previously booked a hotel in XX city" of User A, and the desired characteristic "knowledgeable or experienced about XX city" desired by User B, the notification determiner 315 determines that the desire-to-socialize notification condition (the desire-to-socialize notification condition according to the first exemplary embodiment) is satisfied. Consequently, notification information is provided by the terminal apparatus 2 of User B, unless a determination not to provide notification is made by some other notification determination process.

Although the notification information in this case may include only an indication of the presence of a given visiting user, the notification information may further include one or more of (1) to (3) below:

(1) a desired characteristic desired by the terminal user that a characteristic derived from the visiting user's booking history has matched;

(2) a booking history from which a visiting user's characteristic matching a desired characteristic desired by the terminal user has been derived; and (3) other characteristics of the visiting user.

For example, notification information provided by showing a display "A person knowledgeable or experienced about XX city has authenticated." represents notification information indicative of (1) and not indicative of (2).

For example, notification information provided by showing a display "A person who previously booked a hotel in XX city has authenticated." represents notification information not indicative of (1) and indicative of (2).

If the booking date has already passed, notification information may be provided by showing a display "A person who previously stayed at a hotel in XX city has authenticated".

A characteristic derived from a booking history may not be used for notification determination performed by the notification determiner 315, but may be used only for creation of notification information by the notification information creator 316. Further, notification information provided if a notification condition different from the above-mentioned notification condition is satisfied may be information indicative of a characteristic derived from a booking history.

Notification Setting According to Contents of Document Instructed to be Printed

The foregoing description of the first exemplary embodiment is directed to the case where, with regard to notification determination performed based on the notification setting of a visiting user (see step S203 in FIG. 4), the notification setting is made by the visiting user when performing an operation for transmitting a print job. However, the notification setting according to an exemplary embodiment of the present disclosure may not necessarily be made in the above-mentioned manner. For example, the socializing support apparatus 3 may be adapted such that, in accordance with the contents of a document that the visiting user instructs to be printed, the socializing support apparatus 3 makes a notification setting not to provide notification.

Cases where Functions Other than Printing Function is Used

The foregoing description of the first exemplary embodiment is directed to the case where, with regard to notification determination performed based on the notification setting of a visiting user (see step S203 in FIG. 4), the notification setting is made by the visiting user when performing an operation for transmitting a print job. However, the notification setting according to an exemplary embodiment of the present disclosure may not necessarily be made in the above-mentioned manner.

For example, the notification setting of a visiting user may be set through an operation that the user makes on the shared apparatus prior to being authenticated at the shared apparatus. For instance, a user comes to a position in front of the shared apparatus, and operates the shared apparatus to select either "Normal Mode" or "Security Mode". If the user is authenticated after selecting "Security Mode", a no-notification determination is made when notification determination is performed based on the notification setting of the visiting user. In this case, whether to allow notification for an operation that the user is about to perform can be determined before the user is identified.

Alternatively, for example, the notification setting of a visiting user may be set through an operation that the user makes on the shared apparatus after being authenticated at the shared apparatus. For example, the user comes to a position in front of the shared apparatus and authenticates himself or herself. Then, an operation screen for selecting either "Normal Mode" or "Security Mode" is displayed on the display device 17 of the shared apparatus 1, and the user selects one of the two modes. If the user selects "Security Mode", a no-notification determination is made when notification determination is performed based on the notification setting of the visiting user. It is to be noted that in this mode of operation, a modification has to be made such that the process proceeds to notification determination not at the time when the visiting user is authenticated (i.e., at the time when the presence of the visiting user is detected), but at a time after the user is authenticated at the shared apparatus and after the user makes an operation (the operation related to the notification setting mentioned above) on the shared apparatus. The selection of Normal Mode or Security Mode may not necessarily be made at the timing immediately after authentication. For example, an area to display the current mode may be provided at an edge of the screen, and a screen for switching modes may be displayed upon selecting the area with an operation such as a touch operation. In this case, whether or not to perform notification can be selected based on an operation made by the user.

The foregoing description of the first exemplary embodiment is directed to the case where notification is first provided by the terminal apparatus 2 to the terminal user, and notification to the visiting user by the shared apparatus 1 is provided in response to a response operation made by the terminal user. However, this is not to be construed in a limiting sense.

For example, the socializing support system may be adapted such that if, based on the characteristics of a visiting user and the desired characteristics desired by multiple terminal users, there is any terminal user satisfying a desire-to-socialize notification condition, notification information indicative of the presence of a given terminal user wishing to socialize with the visiting user is provided to the visiting user by the shared apparatus 1, the portable terminal of the visiting user, or other such apparatus.

Although the notification information in this case may include only an indication of the presence of a given terminal user wishing to socialize with the visiting user, the notification information may further include one or more of (1) to (3) below:

(1) the characteristics of the terminal user;
(2) the desired characteristics desired by the terminal user; and
(3) a visiting user's characteristic that has led to satisfying of the desire-to-socialize notification condition.

Referencing of Usage History for Shared Apparatus

The socializing support system may additionally include a history manager 39R that enables referencing of user-specific usage history for the shared apparatus 1. Usage history refers to information such as the time, day of the week, or date of usage. The history manager 39R may be included in the shared apparatus 1.

By allowing user's usage history to be referenced on the screen of the shared apparatus 1 or terminal apparatus 2, or on a material such as a printed material produced by the shared apparatus 1, it is possible to recognize the times when the user with whom socializing is desired tends to use the shared apparatus 1. This helps increase the chances for socializing.

In referencing usage history, a user may be allowed to narrow down the usage history to be displayed or printed to the usage history of a user having a characteristic that matches his or her own desired characteristic, or to the usage history of a user who has a characteristic that he or she has specified on the spot.

Registration of Socializing Record into User Characteristic Manager

A user's socializing record may be registered as a user characteristic in the user characteristic manager 39L of the socializing support system. That is, the user characteristic registerer 318L may register a socializing record into the user characteristic manager 39L as a user characteristic. Referencing such a socializing record registered in the user characteristic manager 39L makes it possible to recognize the user's tendency regarding whether the user desires socializing.

A user's socializing record is created by recording, by means of a sensor or portable terminal, information such as whether a response operation made in response to a notification, or receipt of a notification has led to conversion. By allowing the number of such occurrences to be referenced on, for example, the screen or a printed material, it is possible to recognize whether a user tends to desire socializing.

Second Exemplary Embodiment

A socializing support system according to a second exemplary embodiment will be described below.

Figure 10A:
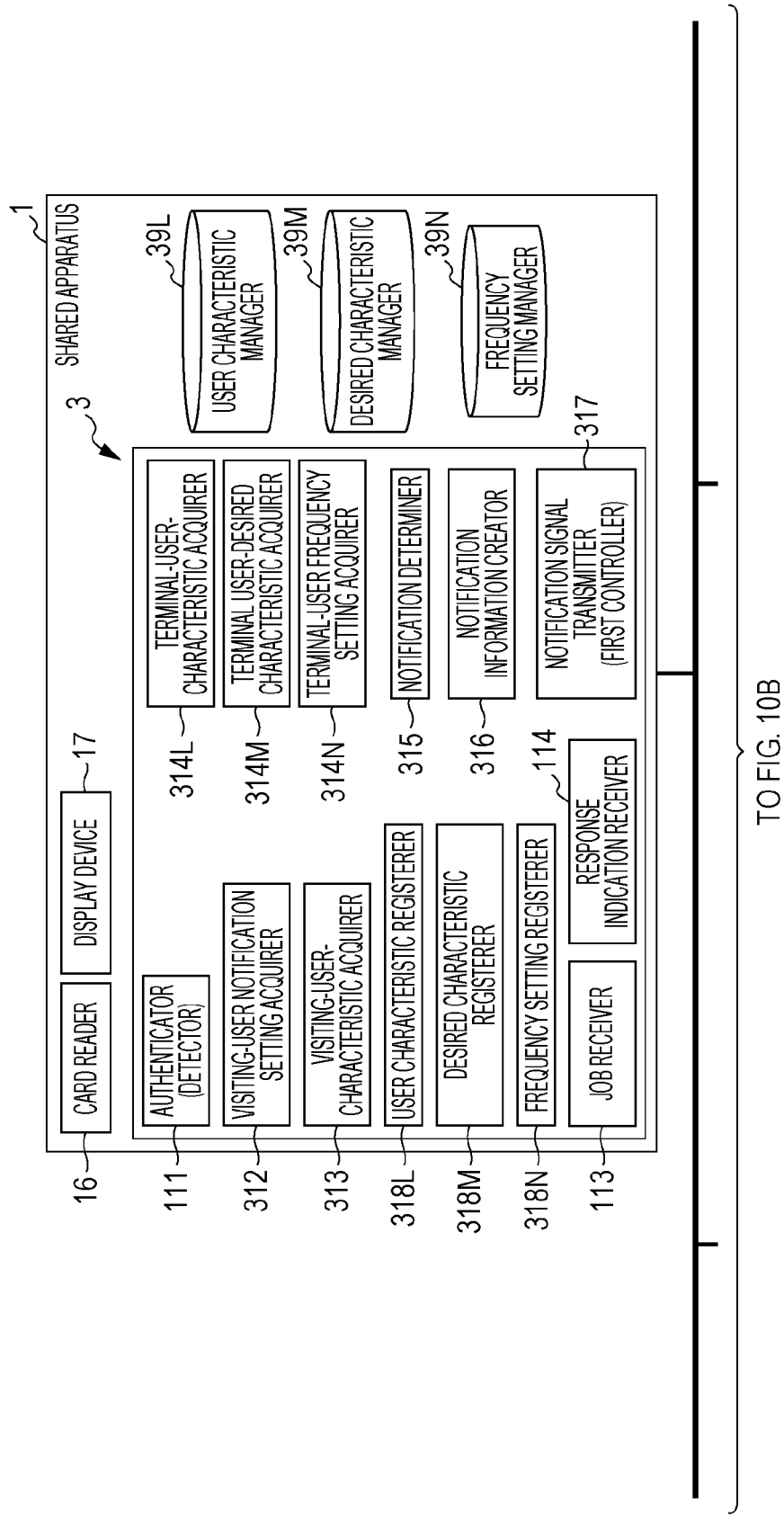

FIGS. 10A and 10B each illustrate the general configuration of the socializing support system according to the second exemplary embodiment. As illustrated in FIGS. 10A and 10B, in the second exemplary embodiment, the shared apparatus 1 includes the socializing support apparatus 3.

Specifically, the shared apparatus 1 includes the user characteristic manager 39L, the desired characteristic manager 39M, and the frequency setting manager 39N.

Further, as its functional components, the shared apparatus 1 includes the user characteristic registerer 318L, the desired characteristic registerer 318M, and the frequency setting registerer 318N.

Further, as its functional components, the shared apparatus 1 includes the authentication information receiver 311, the visiting-user notification setting acquirer 312, the visiting-user-characteristic acquirer 313, the terminal-user-characteristic acquirer 314L, the terminal user-desired characteristic acquirer 314M, the terminal-user frequency setting acquirer 314N, the notification determiner 315, the notification information creator 316, and the notification signal transmitter 317.

Process in Shared Apparatus

Figure 11:
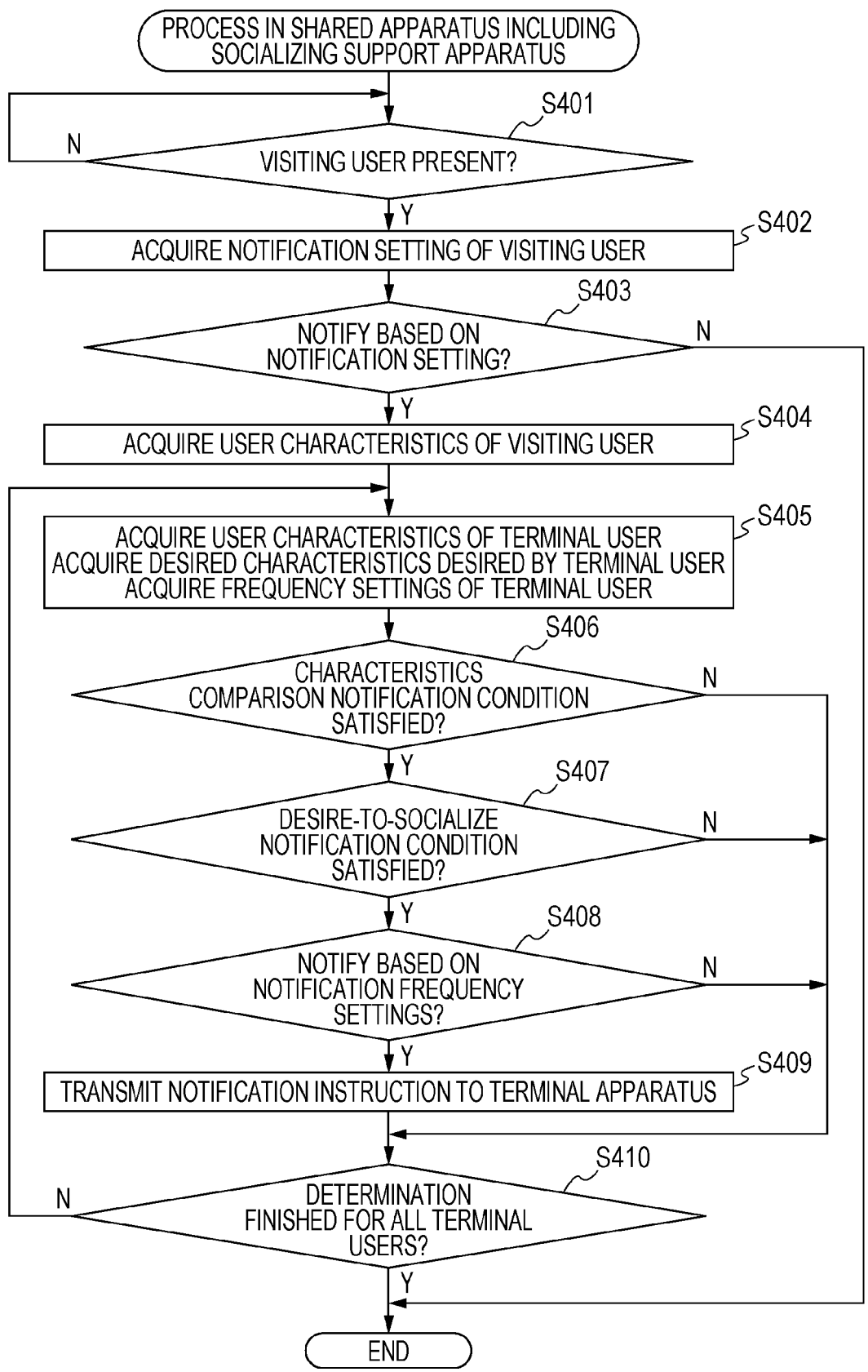
FIG. 11 is a flowchart illustrating a process performed in a shared apparatus according to the second exemplary embodiment.

FIG. 11 is a flowchart illustrating a process performed in the shared apparatus 1 according to the second exemplary embodiment.

At step S401, the shared apparatus 1 acting as the authenticator 111 determines whether a visiting user is present. If no visiting user is determined to be present, the shared apparatus 1 repeats step S401. If a visiting user is determined to be present, the shared apparatus 1 proceeds to step S402.

It can be said that information detected by the authenticator 111 of the socializing support apparatus 3 represents "information indicative of a user visiting the shared apparatus 1". The authenticator 111 corresponds to "detector" according to an exemplary embodiment of the present disclosure.

At step S402, the shared apparatus 1 acting as the visiting-user notification setting acquirer 312 acquires the notification setting of the visiting user.

At step S403, the shared apparatus 1 acting as the notification determiner 315 determines whether or not to provide notification, based on the notification setting of the visiting user. If it is determined not to provide notification (step S403: NO), the shared apparatus 1 ends the process. If it is determined to provide notification (step S403: YES), the shared apparatus 1 proceeds to step S404.

At step S404, the shared apparatus 1 acting as the visiting-user-characteristic acquirer 313 acquires user characteristic information of the visiting user from the user characteristic manager 39L.

At step S405, the shared apparatus 1 performs the following operations. The shared apparatus 1 acting as the terminal-user-characteristic acquirer 314L acquires user characteristic information of one of multiple terminal users from the user characteristic manager 39L. The shared apparatus 1 acting as the terminal user-desired characteristic acquirer 314M acquires desired characteristic information of the terminal user from the desired characteristic manager 39M. Further, the shared apparatus 1 acting as the terminal-user frequency setting acquirer 314N acquires the notification frequency settings of the terminal user from the frequency setting manager 39N.

At step S406, the shared apparatus 1 acting as the notification determiner 315 determines, based on the user characteristics of the visiting user and the user characteristics of the terminal user, whether a notification condition (characteristics comparison notification condition) is satisfied.

If the characteristics comparison notification condition is not satisfied (step S406: NO), the shared apparatus 1 proceeds to step S410.

If the characteristics comparison notification condition is satisfied (step S406: YES), the shared apparatus 1 proceeds to step S407.

At step S407, the shared apparatus 1 acting as the notification determiner 315 determines, based on the user characteristic information of the visiting user and the desired characteristic information of the terminal user, whether a notification condition (desire-to-socialize notification condition) is satisfied.

If the desire-to-socialize notification condition is not satisfied (step S407: NO), the shared apparatus 1 proceeds to step S410.

If the desire-to-socialize notification condition is satisfied (step S407: YES), the shared apparatus 1 proceeds to step S408.

At step S408, the shared apparatus 1 acting as the notification determiner 315 determines whether or not to provide notification, based on the notification frequency settings of the terminal user.

If it is determined not to provide notification (step S408: NO), the shared apparatus 1 proceeds to step S410.

If it is determined to provide notification (step S408: YES), the shared apparatus 1 proceeds to step S409.

At step S409, the shared apparatus 1 acting as the notification signal transmitter 317 transmits a notification instruction (a signal for providing a first notification) to the terminal apparatus 2.

The notification signal transmitter 317 of the shared apparatus 1 corresponds to "first controller" according to an exemplary embodiment of the present disclosure.

At step S410, the shared apparatus 1 determines whether the steps after step S405 have been executed for all of terminal users.

If the steps after step S405 have not been executed for all of terminal users (step S410: NO), the shared apparatus 1 repeats the process from step S405 onward for any terminal user for whom the above-mentioned steps have not yet been executed.

If the steps after step S405 have been executed for all of terminal users (step S410: YES), the shared apparatus 1 ends the process.

Process in Terminal Apparatus

A process performed in each terminal apparatus 2 according to the second exemplary embodiment is the same as the process according to the first exemplary embodiment (see FIG. 5), and thus will not be described in further detail.

As can be appreciated from the foregoing description, although the process according to the first exemplary embodiment includes the step of transmitting authentication information of a visiting user from the shared apparatus 1 to the socializing support apparatus 3 that is an external apparatus, such a step is not necessary in the second exemplary embodiment.

The foregoing description of the second exemplary embodiment is directed to the case where the shared apparatus 1 includes each manager 39. Alternatively, one or all of the managers 39 may be provided at a location outside the shared apparatus 1 and on a network.

The foregoing description of the second exemplary embodiment of the present disclosure is directed to the case where the notification determinations at steps S403, S406, S407, and S408 are all performed at the shared apparatus 1. However, this is not to be construed in a limiting sense. For example, the second exemplary embodiment may be modified such that only the notification determination based on the notification frequency settings of the terminal user (step S408) is performed at each terminal apparatus 2. The second exemplary embodiment may be further modified such that, in this case, the terminal apparatus 2 includes the frequency setting manager 39N.

Third Exemplary Embodiment

A socializing support system according to a third exemplary embodiment will be described below.

Figure 12A:
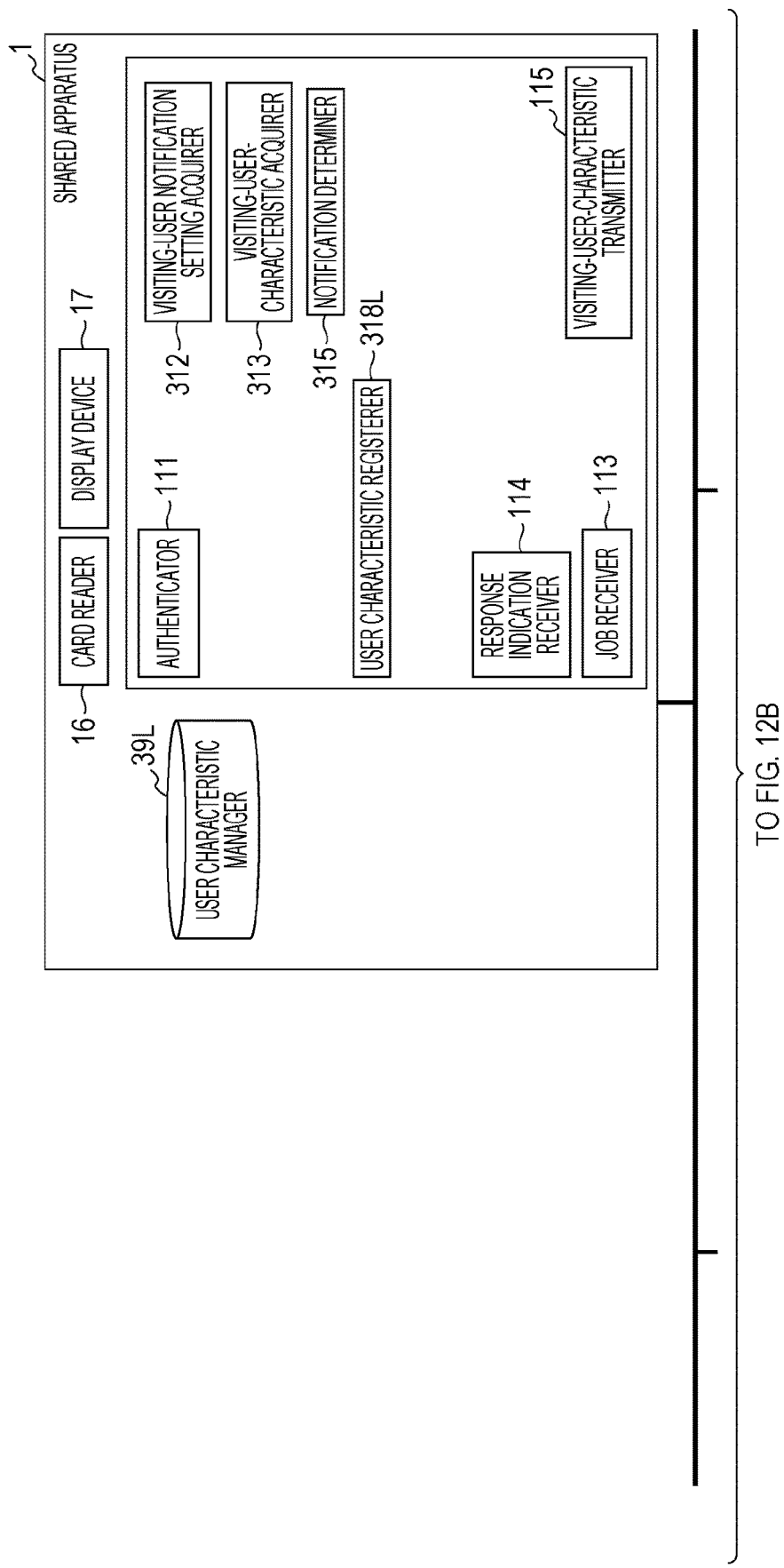
FIGS. 12A and 12B each illustrate the functional configuration of a socializing support system according to a third exemplary embodiment.
Figure 12B:
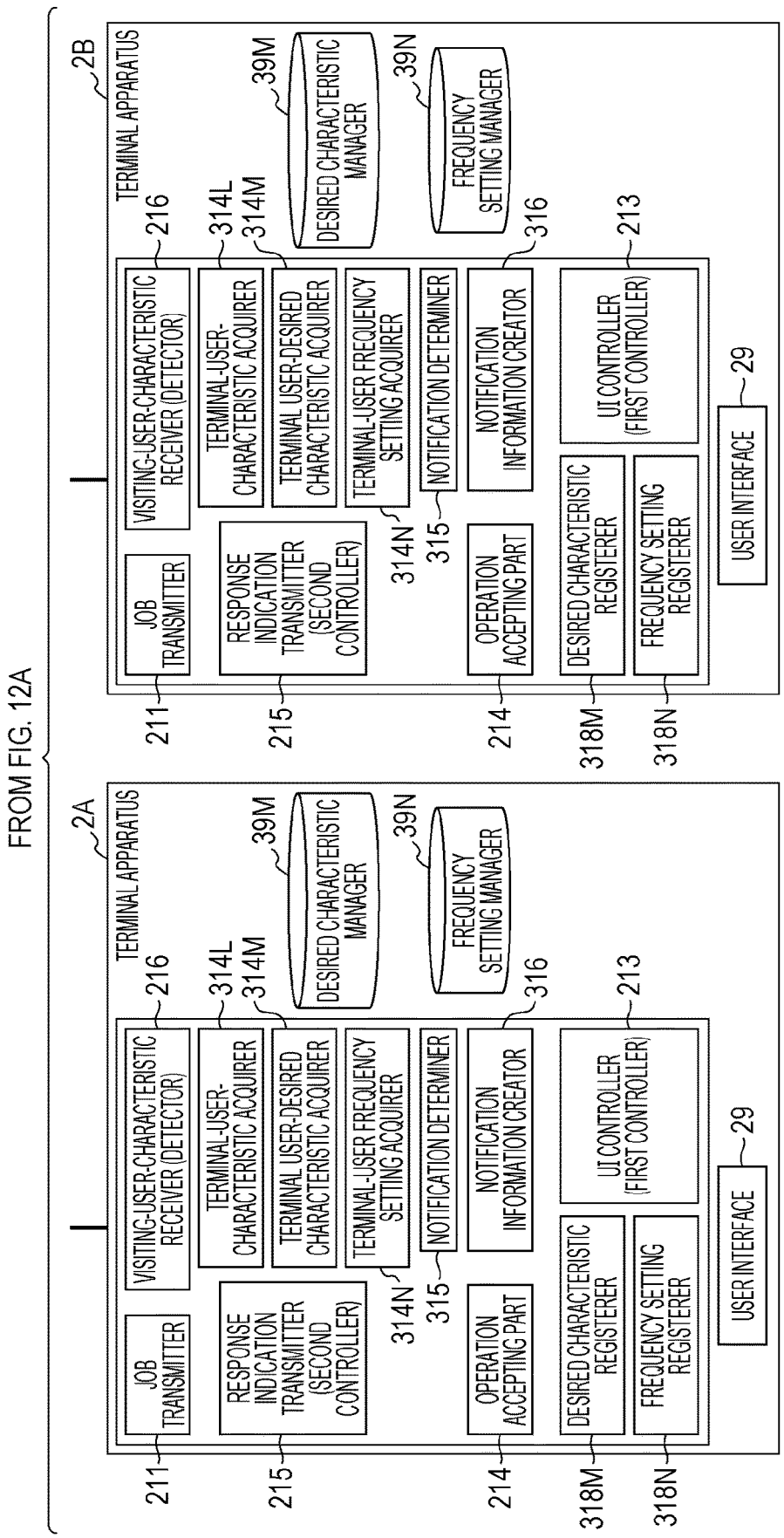
Figure 14:
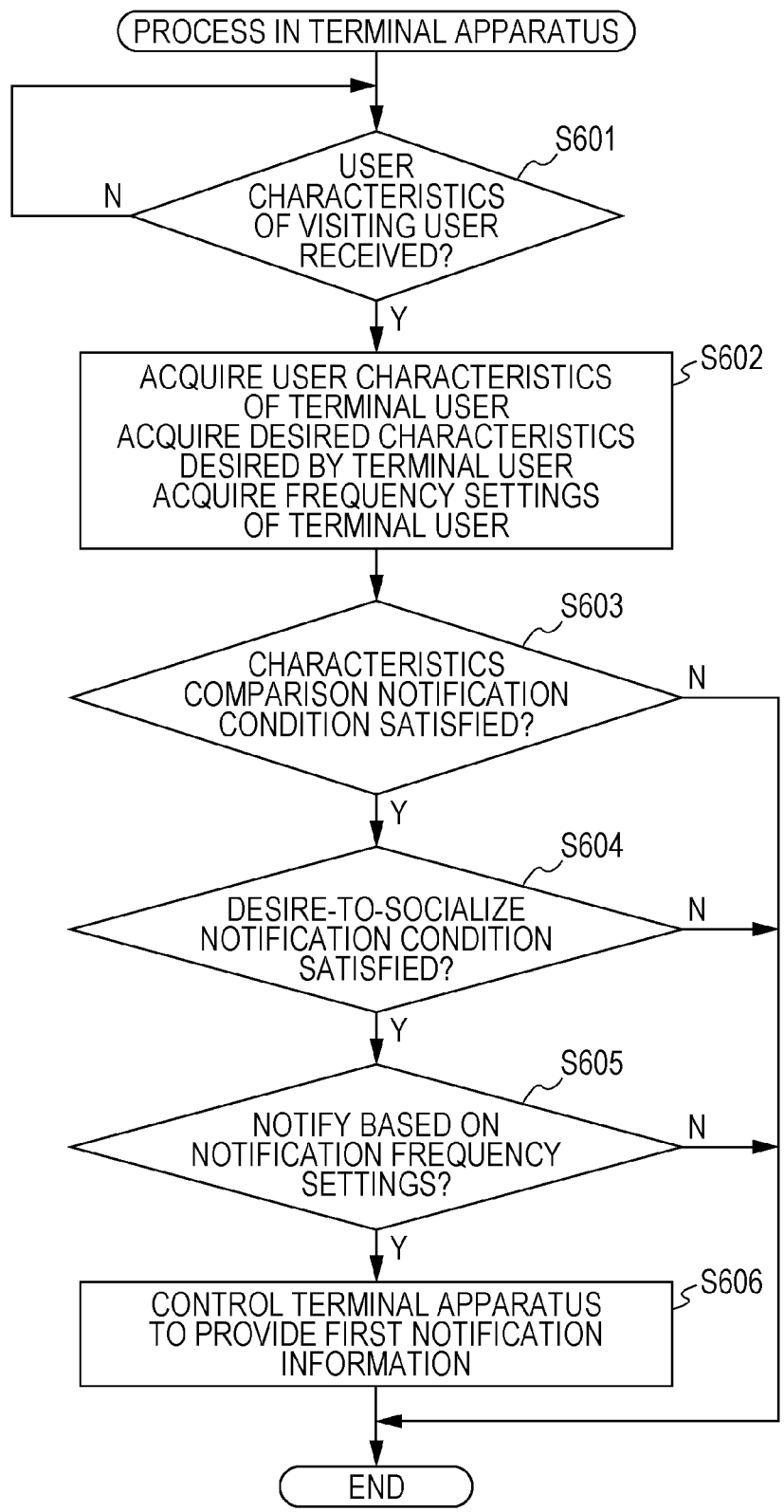
FIG. 14 is a flowchart illustrating a process performed in each terminal apparatus according to the third exemplary embodiment.

FIGS. 12A and 12B each illustrate the general configuration of the socializing support system according to the third second exemplary embodiment. FIGS. 13 and 14 are flowcharts each illustrating a process according to the third exemplary embodiment.

As illustrated in FIGS. 12A and 12B, in the third exemplary embodiment, the shared apparatus 1 includes, as its functional components, the authenticator 111, the visiting-user notification setting acquirer 312, the visiting-user-characteristic acquirer 313, the notification determiner 315, and a visiting-user-characteristic transmitter 115. The terminal apparatus 2 includes, as its functional components, a visiting-user-characteristic receiver 216, the terminal-user-characteristic acquirer 314L, the terminal user-desired characteristic acquirer 314M, the terminal-user frequency setting acquirer 314N, the notification determiner 315, and the notification information creator 316.

Process in Shared Apparatus

FIG. 13 is a flowchart illustrating a process performed in the shared apparatus 1 according to the third exemplary embodiment.

At step S501, the shared apparatus 1 acting as the authenticator 111 determines whether a visiting user is present. If no visiting user is determined to be present, the shared apparatus 1 repeats step S501. If a visiting user is determined to be present, the shared apparatus 1 proceeds to step S502.

At step S502, the shared apparatus 1 acting as the visiting-user notification setting acquirer 312 acquires the notification setting of the visiting user.

At step S503, the shared apparatus 1 acting as the notification determiner 315 determines whether or not to provide notification, based on the notification setting of the visiting user. If it is determined not to provide notification (step S503: NO), the shared apparatus 1 ends the process. If it is determined to provide notification (step S503: YES), the shared apparatus 1 proceeds to step S504.

At step S504, the shared apparatus 1 acting as the visiting-user-characteristic acquirer 313 acquires user characteristic information of the visiting user from the user characteristic manager 39L.

At step S505, the shared apparatus 1 acting as the visiting-user-characteristic transmitter 115 transmits user characteristic information of the visiting user to each terminal apparatus 2.

Process in Each Terminal Apparatus 2

FIG. 14 is a flowchart illustrating a process performed in each terminal apparatus 2 according to the third exemplary embodiment.

At step S601, the terminal apparatus 2 acting as the visiting-user-characteristic receiver 216 receives user characteristic information of a visiting user from the shared apparatus 1.

At step S602, the terminal apparatus 2 performs the following operations. The terminal apparatus 2 acting as the terminal-user-characteristic acquirer 314L acquires user characteristic information of one of multiple terminal users from the user characteristic manager 39L. The terminal apparatus 2 acting as the terminal user-desired characteristic acquirer 314M acquires desired characteristic information of the terminal user from the desired characteristic manager 39M. Further, the terminal apparatus 2 acting as the terminal-user frequency setting acquirer 314N acquires the notification frequency settings of the terminal user from the frequency setting manager 39N.

At step S603, the terminal apparatus 2 acting as the notification determiner 315 determines, based on the user characteristics of the visiting user and the user characteristics of the terminal user, whether a notification condition (characteristics comparison notification condition) is satisfied.

If the characteristics comparison notification condition is not satisfied (step S603: NO), the terminal apparatus 2 ends the process.

If the characteristics comparison notification condition is satisfied (step S603: YES), the terminal apparatus 2 proceeds to step S604.

At step S604, the terminal apparatus 2 acting as the notification determiner 315 determines, based on the user characteristic information of the visiting user and the desired characteristic information of the terminal user, whether a notification condition (desire-to-socialize notification condition) is satisfied.

If the desire-to-socialize notification condition is not satisfied (step S604: NO), the terminal apparatus 2 ends the process.

If the desire-to-socialize notification condition is satisfied (step S604: YES), the terminal apparatus 2 proceeds to step S605.

At step S605, the terminal apparatus 2 acting as the notification determiner 315 determines whether or not to provide notification, based on the notification frequency settings of the terminal user.

If it is determined not to provide notification (step S605: NO), the terminal apparatus 2 ends the process.

If it is determined to provide notification (step S605: YES), the terminal apparatus 2 proceeds to step S606.

At step S606, the terminal apparatus 2 acting as the UI controller 213 controls the user interface 29 to provide first notification information to the terminal user. Specifically, the terminal apparatus 2 acting as the UI controller 213 controls a display device, which represents an example of the user interface 29, to display first notification information.

The UI controller 213 of the terminal apparatus 2 corresponds to "first controller" according to an exemplary embodiment of the present disclosure.

Then, the terminal apparatus 2 ends the process.

It is to be noted that in the process illustrated in FIG. 14, the steps after step S303 that are performed in the terminal apparatus 2 according to the first exemplary embodiment are not performed. Alternatively, these steps may be similarly performed in the third exemplary embodiment.

As can be appreciated from the foregoing description, in the third exemplary embodiment, the acquisition of user characteristic information of a visiting user from the user characteristic manager 39L is performed at the shared apparatus 1, and the notification determinations based on the user characteristic information, desired characteristic information, and notification frequency settings of a terminal user (steps S603, S604, and S605) are performed at each terminal apparatus 2. Further, in the third exemplary embodiment, the notification determination based on the notification setting of the visiting user (step S503) is performed at the shared apparatus 1.

In the third exemplary embodiment described above, each terminal apparatus 2 includes the desired characteristic manager 39M. The desired characteristic manager 39M of each terminal apparatus 2 may be made to manage desired characteristic information on the user of the terminal apparatus 2 but not desired characteristic information on other users.

The foregoing description of the third exemplary embodiment is directed to the case where the shared apparatus 1 or the terminal apparatus 2 includes each manager 39. Alternatively, one or all of the managers 39 may be provided at a location outside the shared apparatus 1 and the terminal apparatus 2 and on a network.

In the third exemplary embodiment, it is possible to either recognize the visiting-user-characteristic receiver 216 of the terminal apparatus 2 as corresponding to "detector" according to an exemplary embodiment of the present disclosure, or recognize the authenticator 111 of the shared apparatus 1 as corresponding to "detector" according to an exemplary embodiment of the present disclosure.

Supplementary Description

Although the foregoing description of the exemplary embodiments is directed to the case where the shared apparatus is installed in a shared office, this is not to be construed in a limiting sense. For example, the shared apparatus may be installed in a place that is not a shared office and used by multiple users.

In the exemplary embodiments mentioned above, as illustrated in FIG. 4 or other figures, notification is provided on the condition that both a characteristics comparison notification condition and a desire-to-socialize notification condition are satisfied. However, this is not to be construed in a limiting sense.

Figure 6:
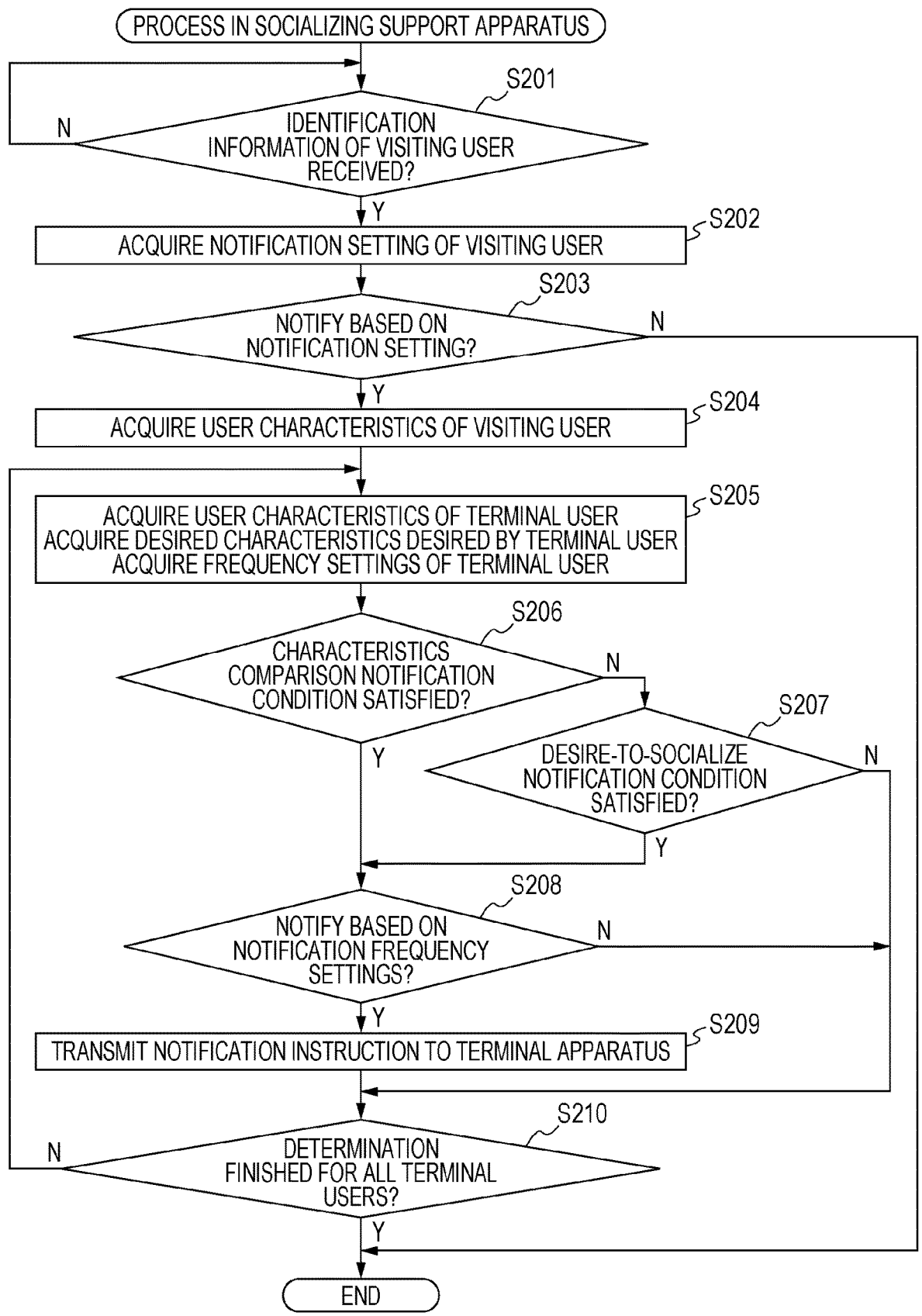
FIG. 6 is a flowchart illustrating a modification of the process performed in the socializing support apparatus according to the first exemplary embodiment.

For example, the socializing support system may be adapted such that, as in the process illustrated in FIG. 6, if one of a characteristics comparison notification condition and a desire-to-socialize notification condition is satisfied, notification can be provided even if the other condition is not satisfied. Further, for example, as in the case of the process illustrated in FIG. 6, the necessary condition for providing the first notification may be that one of a characteristics comparison notification condition and a desire-to-socialize notification condition is satisfied.

Although various notification conditions have been described above with reference to the exemplary embodiments, such notification conditions may be modified by settings made by the system administrator or individual users.

The foregoing description of the exemplary embodiments is directed to the case where the notification determination performed based on the notification frequency settings of a terminal user is performed based on the criterion of whether the same notification has been previously provided within the same specific time period of interest. However, this is not to be construed in a limiting sense.

For example, the notification determination performed based on the notification frequency settings of a terminal user may be performed based on the criterion of whether, within the same specific time period of interest, a notification with a degree of match greater than or equal to a threshold has been previously provided.

The term "notification with a degree of match greater than or equal to a threshold" as used herein refers to a notification whose degree of match in terms of (1) visiting user and (2) the information being notified is greater than or equal to a threshold. In this regard, a case is considered where User A is a visiting user, and within the same specific time period of interest, a notification has been previously provided with respect to User A and, as a result of a modification to user characteristic information registered with respect to User A, there has been a change to the characteristics of User A of which notification is to be provided as notification information. Even in this case, if the amount of change is small, it may be determined that a "notification with a degree of match greater than or equal to a threshold" has been previously provided, and thus it may be determined not to provide notification.

ADDITIONAL REMARKS

From the exemplary embodiments of the present disclosure, at least the following implementations may be conceptualized.

The "socializing support system" according to an exemplary embodiment of the present disclosure refers to a system including at least a shared apparatus and multiple terminal apparatuses. By contrast, the "socializing support apparatus" according to an exemplary embodiment of the present disclosure may not necessarily include a shared apparatus or a terminal apparatus.

Socializing Support Method (1-1) A socializing support method using a socializing support system, the socializing support system including a detector and a plurality of terminal apparatuses, the detector detecting presence of a visiting user, the socializing support method including if a notification condition is satisfied, providing first notification information from each of the terminal apparatuses to a terminal user using the terminal apparatus, the notification condition being presence of the visiting user, the first notification information being information indicative of presence of the visiting user, the terminal user being different from the visiting user.

Socializing Support System (2-1) A socializing support system including:

a shared apparatus including a detector, the detector detecting presence of a visiting user;

a plurality of terminal apparatuses; and a first controller that controls notification of first notification information, the notification being provided from each of the terminal apparatuses to a terminal user using the terminal apparatus if a notification condition is satisfied, the notification condition being detection of presence of the visiting user, the first notification information being information indicative of presence of the visiting user, the terminal user being different from the visiting user.

Shared Apparatus (3-1) A shared apparatus used in the socializing support system according to (2-1).

(3-2) A shared apparatus including:

a detector that detects presence of a visiting user; and a first controller that controls notification of first notification information, the notification being provided from a terminal apparatus to a terminal user if a notification condition is satisfied, the notification condition being detection of presence of the visiting user, the first notification information being information indicative of presence of the visiting user, the terminal user being a user of the terminal apparatus different from the visiting user.

(3-3) A shared apparatus including:

a detector that detects presence of a visiting user; and a visiting-user identification information transmitter that transmits, to an external location, an indication of presence of the visiting user, and information that enables identification of the visiting user.

(3-4) A shared apparatus including:

a detector that detects presence of a visiting user;

a visiting-user-characteristic acquirer that acquires user characteristic information of the visiting user; and a visiting-user-characteristic transmitter that transmits, to an external location, an indication of presence of the visiting user, and the user characteristic information of the visiting user.

Terminal Apparatus (4-1) A terminal apparatus used in the socializing support system according to (2-1).

(4-2) A terminal apparatus including:

a detector that detects presence of a visiting user; and a first controller that controls notification of first notification information, the notification being provided from a terminal apparatus to a user if a notification condition is satisfied, the notification condition being detection of presence of the visiting user, the first notification information being information indicative of presence of the visiting user, the user being a user of the terminal apparatus different from the visiting user.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A socializing support apparatus comprising:
    a detector that detects presence of a visiting user based on an authentication information received from a shared apparatus, the visiting user being a user operating the shared apparatus; and
    a first controller that controls notification of first notification information based on an authentication information received from the shared apparatus and a notification setting received from a terminal apparatus operated by a terminal user, wherein
    the notification is transmitted to the terminal apparatus if a notification condition is satisfied,
    the notification condition is detection of presence of the visiting user and the notification setting that has been set by the terminal user via the terminal apparatus, the first notification information is information indicative of presence of the visiting user,
    the terminal user is a user of the terminal apparatus different from the visiting user,
    the shared apparatus is an image forming apparatus.

2. The socializing support apparatus according to claim 1, further comprising
    a user characteristic registerer that registers user characteristic information, the user characteristic information being information indicative of a characteristic of a user,
    wherein the detector further detects information that enables identification of the visiting user, and
    wherein the first notification information further includes the user characteristic information of the visiting user.

3. The socializing support apparatus according to claim 1, further comprising
    a user characteristic registerer that registers user characteristic information, the user characteristic information being information indicative of a characteristic of a user, wherein
    the first controller controls notification of the first notification information that is transmitted to the terminal apparatus if a notification condition is satisfied,
    the notification condition is that an industry type indicated by the user characteristic information of the visiting user does not match an industry type indicated by the user characteristic information of the terminal user.

4. The socializing support apparatus according to claim 1, further comprising:
    a user characteristic registerer that registers user characteristic information, the user characteristic information being information indicative of a characteristic of a user; and
    a desired characteristic registerer that registers desired characteristic information, the desired characteristic information being information indicative of a characteristic for which a user desires socializing, wherein
    the first controller controls notification of the first notification information that is transmitted to the terminal apparatus if a desire-to-socialize notification condition is satisfied,
    the desire-to-socialize notification condition is a notification condition based on the user characteristic information of the visiting user and the desired characteristic information of the terminal user.

5. The socializing support apparatus according to claim 4, further comprising
    a frequency setting registerer that registers a notification frequency setting for each characteristic indicated by the desired characteristic information of a user,
    wherein the notification condition further includes a condition that a determination not to provide notification is not made based on the notification frequency setting.

6. The socializing support apparatus according to claim 2, wherein the characteristic includes at least one of a user's industry type, a user's job type, and a user's specialty field.

7. The socializing support apparatus according to claim 2, wherein the user characteristic registerer registers user characteristic information extracted from user's schedule information or user's various history information.

8. The socializing support apparatus according to claim 1, further comprising
    a new information acquirer that acquires new information available for the visiting user,
    wherein the first notification information further includes the new information available for the visiting user.

9. The socializing support apparatus according to claim 1, further comprising:
    an operation accepting part that accepts an operation made on the terminal apparatus with which the notification is provided;
    a second controller that controls a second notification, the second notification being a notification of response information responsive to the operation, the second notification being provided to the visiting user from the shared apparatus or from a portable terminal apparatus of the visiting user.

10. The socializing support apparatus according to claim 9, wherein the operation includes at least one of
    an operation made to provide, as the response information, information indicative of an intention to go to the shared apparatus right now, and
    an operation made to provide, as the response information, information indicative of an intention not to go to the shared apparatus right now but indicative of a desire to talk to the visiting user.

11. The socializing support apparatus according to claim 1, wherein the first notification information is provided by showing a display that continues only for a period of time during which the visiting user is present.

12. The socializing support apparatus according to claim 1, wherein the socializing support apparatus further comprises a no-notification setting part that sets a no-notification setting in accordance with an operation made by the visiting user when providing a print instruction to the shared apparatus or in accordance with contents of a document for which a print instruction is provided by the visiting user, the no-notification setting being a setting not to provide notification with respect to the print instruction provided by the visiting user, and wherein the notification condition further includes a condition that the no-notification setting is not being set for the print instruction provided by the visiting user.

13. A non-transitory computer readable medium storing a program causing a computer to execute a process, the process comprising:

detecting presence of a visiting user based on an authentication information received from a shared apparatus, the visiting user being a user visiting a operating the shared apparatus; and controlling notification of first notification information based on an authentication information received from the shared apparatus and a notification setting received from a terminal apparatus operated by a terminal user, wherein the notification is transmitted to the terminal apparatus if a notification condition is satisfied, the notification condition is detection of presence of the visiting user and the notification setting that has been set by the terminal user via the terminal apparatus, the first notification information is information indicative of presence of the visiting user, the terminal user is a user of the terminal apparatus different from the visiting user, the shared apparatus is an image forming apparatus.

14. A socializing support apparatus comprising:

detector means for detecting presence of a visiting user based on an authentication information received from a shared apparatus, the visiting user being a user operating the shared apparatus; and first controller means for controlling notification of first notification information based on an authentication information received from the shared apparatus and a notification setting received from a terminal apparatus operated by a terminal user, wherein the notification is transmitted to the terminal apparatus if a notification condition is satisfied, the notification condition is detection of presence of the visiting user and the notification setting that has been set by the terminal user via the terminal apparatus, the first notification information is information indicative of presence of the visiting user, the terminal user is a user of the terminal apparatus different from the visiting user, the shared apparatus is an image forming apparatus.

* * * * *